United States Patent
Mise et al.

(10) Patent No.: US 7,634,299 B2
(45) Date of Patent: Dec. 15, 2009

(54) COMMUNICATION TERMINAL APPARATUS, METHOD OF CHANGING FUNCTION AND/OR SETTING OF COMMUNICATION TERMINAL APPARATUS, AND PROGRAM

(75) Inventors: Hiroaki Mise, Tokyo (JP); Hideki Natsumura, Tokyo (JP); Shigeki Yatabe, Tokyo (JP); Tetsuo Otsuji, Tokyo (JP)

(73) Assignee: Pioneer Corporation, Tokyo (JP)

( * ) Notice: Subject to any disclaimer, the term of this patent is extended or adjusted under 35 U.S.C. 154(b) by 456 days.

(21) Appl. No.: 11/217,133

(22) Filed: Sep. 1, 2005

(65) Prior Publication Data

US 2006/0057966 A1   Mar. 16, 2006

(30) Foreign Application Priority Data

Sep. 2, 2004   (JP)   ............... P2004-255822

(51) Int. Cl.
*H04M 1/00* (2006.01)
*H04B 1/38* (2006.01)

(52) U.S. Cl. ............ 455/567; 455/456.1; 455/456.6; 455/412.1; 455/418; 455/552.1; 455/553.1; 455/556.1; 455/90.1; 455/566; 340/539.11; 340/539.13; 340/539.22; 340/539.26

(58) Field of Classification Search ....... 455/41.1–41.2, 455/404.1–404.2, 414.1–414.2, 456.1–456.3, 455/556.1–556.2, 410, 411, 412.1–412.2, 455/413, 414.3, 415, 418, 456.6, 567, 90.1–90.2, 455/552.1, 553.1, 566; 340/539.1, 539.11–539.13, 340/572.1, 573.1, 539.22–539.29

See application file for complete search history.

(56) References Cited

U.S. PATENT DOCUMENTS 6,992,580 B2 *   1/2006   Kotzin et al. ........... 340/539.11
2006/0109102 A1 *   5/2006   Gortz et al. ................. 340/531

FOREIGN PATENT DOCUMENTS

| JP | 02-058952 | 2/1990 |
|---|---|---|
| JP | 08-167936 | 6/1996 |
| JP | 11-168769 | 6/1999 |
| JP | 11-252004 | 9/1999 |
| JP | 2000-059482 | 2/2000 |
| JP | 2000-188781 | 7/2000 |
| JP | 2001-127838 | 5/2001 |
| JP | 2001-189774 | 7/2001 |
| JP | 2001-189794 | 7/2001 |
| JP | 2001-245024 | 9/2001 |
| JP | 2002-135396 | 5/2002 |
| JP | 2002-209262 | 7/2002 |
| JP | 2002-218011 | 8/2002 |
| JP | 2002-232598 | 8/2002 |
| JP | 2003-296856 | 10/2003 |
| JP | 2003-333132 | 11/2003 |
| JP | 2004-173049 | 6/2004 |

* cited by examiner

*Primary Examiner*—Tuan A Tran
(74) *Attorney, Agent, or Firm*—Drinker Biddle & Reath LLP

(57) ABSTRACT

A communication terminal apparatus includes a situation change detecting unit that detects a change in external situation and transmits an external situation change detection signal, and a control unit that receives the external situation change detection signal, thereby reads out a predetermined function and/or setting stored in a storing unit, and changes the functions and/or setting.

2 Claims, 24 Drawing Sheets

FIG. 5

Account Name: on-mode-01
Telephone Number: xxx-yyyy-zzzA
E-Mail Address: surname@xxxx.ne.jp
Incoming Call Volume: 01
Incoming Call Sound: Solemn Sound Wallpaper: Office
Color Pattern: blue → (to off-mode)
- 18 O'CLOCK HAS PASSED
- COME OUT COMPANY
- IT IS HOLIDAY
- TOUCH PORTION OF BODY TEMPERATURE SENSOR OF TERMIANAL TO CHEEK ← (to on-mode)
- 9 O'CLOCK HAS PASSED
- ENTER COMPANY
- IT IS BUSINESS DAY

Account Name: off-mode-01
Telephone Number: xxx-yyyy-zzzC
E-Mail Address: firstname@xxxx.ne.jp
Incoming Call Volume: 03
Incoming Call Sound: Amazing Sound Wallpaper: Home
Color Pattern: red ↘ (to meeting-mode)
- ARRIVE AT AIRPORT
- ENTER CONFERENCE ROOM
- HIGHER OFFICER APPROACH
- PUT PHONE IN POCKET

Account Name: meeting-mode-01
Telephone Number: xxx-yyyy-zzzB
E-Mail Address: surname@xxxx.ne.jp
Incoming Call Volume: OFF
Incoming Call Sound: OFF Wallpaper: Conference Room
Color Pattern: None

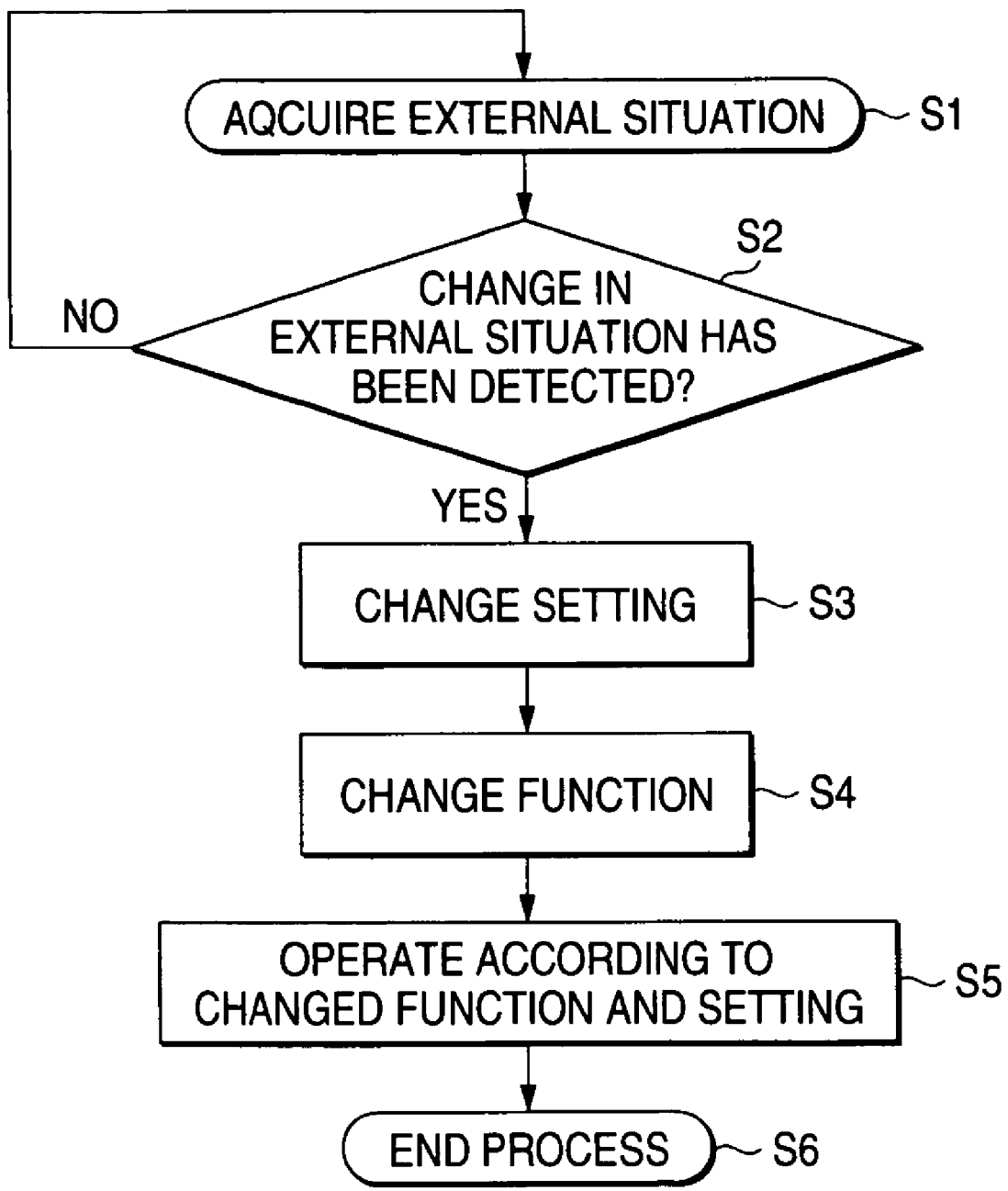

COMMUNICATION TERMINAL APPARATUS, METHOD OF CHANGING FUNCTION AND/OR SETTING OF COMMUNICATION TERMINAL APPARATUS, AND PROGRAM

BACKGROUND OF THE INVENTION

1. Field of the Invention

The present invention relates to a communication terminal apparatus, a method of changing functions and/or setting of such a communication terminal apparatus, and a program.

2. Description of the Related Art

A cellular phone, one of communication terminals, has recently been popularized. The functions of the cellular phone include a telephone function, an electronic mail transmission and reception function, and the like. Various setting mode can include a receiving sound setting mode, an incoming call sound setting mode, an electronic mail address setting mode, and the like. For example, when a user is located at a place where communication is not suitable, such as a conference room and a subway, in order not to give surrounding people trouble due to incoming call sound, there is a manner mode where an incoming call is notified through vibration without generating incoming call sound.

A user himself can select a desired one of the setting modes depending on situations. The user can also change the setting mode by operating keys, while viewing a screen displayed on a display unit of the cellular phone.

On the other hand, there is a security system using a cellular phone in which only a specific setting mode of the cellular phone is automatically switched although the user himself does not operate keys. This system is disclosed in, for example, JP-A-2003-296856.

The security system using the cellular phone includes two kinds of security modes, including a security state where a security area is defended and a release state where the security area is not defended. If an incoming call is received, a cellular phone number of a transmission side is acquired. The acquired telephone number is compared with a previously registered telephone number of the cellular phone. If the cellular phone number of the transmission side is identical to the previously registered telephone number of the cellular phone, a current security mode automatically switches to the other security mode.

There is also a cellular phone in which telephone directory data of the cellular phone are automatically registered, even when a user does not operate keys. In the case where telephone directory data having a predetermined format is included in a received electronic mail, when a cellular phone is newly purchased or the model of a cellular phone is changed, telephone directory data is newly registered or previously registered telephone directory data is rewritten.

In the related art cellular phone, however, if the function and setting mode are to be changed, a user has to perform a series of operations while viewing a screen displayed on the display unit of the cellular phone. This gives the user trouble.

Further, the cellular phone disclosed in JP-A-2003-296856 can be applied to a special use, such as a security system, but cannot automatically change functions and setting in common cellular phones.

In addition, the cellular phone disclosed in JP-A-2002-135396 performs only automatic registration or rewriting of telephone directory data, but cannot perform automatic change other functions and setting modes.

In the case in which one cellular phone is used for a business use and a personal use, it is very convenient to change unique values of respective functions, if necessary.

The unique value of each function can include a unique value of a function of notifying presence of a task through alarm at designated time when the task is recorded in a calendar, a unique value of a function of displaying conversion candidates or input prediction candidates when a sentence is written by mail or the like, a unique value of a function of managing application groups, which are classified by purposes, in groups, a unique value of a function of displaying a mail address registered in a mail address directory, and the like.

In the related art cellular phone, however, it is difficult to use one cellular phone for a business use and a personal use by simply switching the unique values of the respective functions.

SUMMARY OF THE INVENTION

The present invention provides a communication terminal apparatus which can automatically change functions and setting modes according to external situations, a method of changing functions and/or setting of such a communication terminal apparatus, and a program.

According to a first aspect of the present invention, a communication terminal apparatus includes a situation change detecting unit that detects a change in external situation and transmits an external situation change detection signal, and a control unit that receives the external situation change detection signal, thereby reads out a predetermined function and/or setting stored in a storing unit, and changes the functions and/or setting.

According to a second aspect of the present invention, a method of changing functions and/or setting of a communication terminal apparatus includes detecting a change in external situation and transmitting an external situation change detection signal, and receiving the external situation change detection signal, thereby reading out a predetermined function and/or setting stored in a storing unit, and changing the function and/or setting.

According to a third aspect of the present invention, 14. A storage medium readable by a computer, the storage medium storing a program of instructions executable by the computer to perform a function for changing functions and/or setting of a communication terminal apparatus, the function includes the steps of detecting a change in external situation and transmitting an external situation change detection signal, and receiving the external situation change detection signal, thereby reading out a predetermined function and/or setting stored in a storing unit, and changing the function and/or setting.

BRIEF DESCRIPTION OF THE DRAWINGS

FIG. 5 is a diagram showing a transition image of a telephone number and an example that an account name, a telephone number, an electronic mail address, incoming call volume, incoming call sound, wallpaper, a color pattern, or the like is changed under the control of a control unit in the embodiment of the present invention;

FIG. 6 is a flowchart illustrating the operation of a cellular phone device according to the embodiment of the present invention;

DETAILED DESCRIPTION OF THE INVENTION

Hereinafter, an embodiment of a communication terminal apparatus according to the present invention will be described in detail with reference to the accompanying drawings. In this embodiment, a cellular phone device is used as an example of the communication terminal apparatus.

Figure 1:
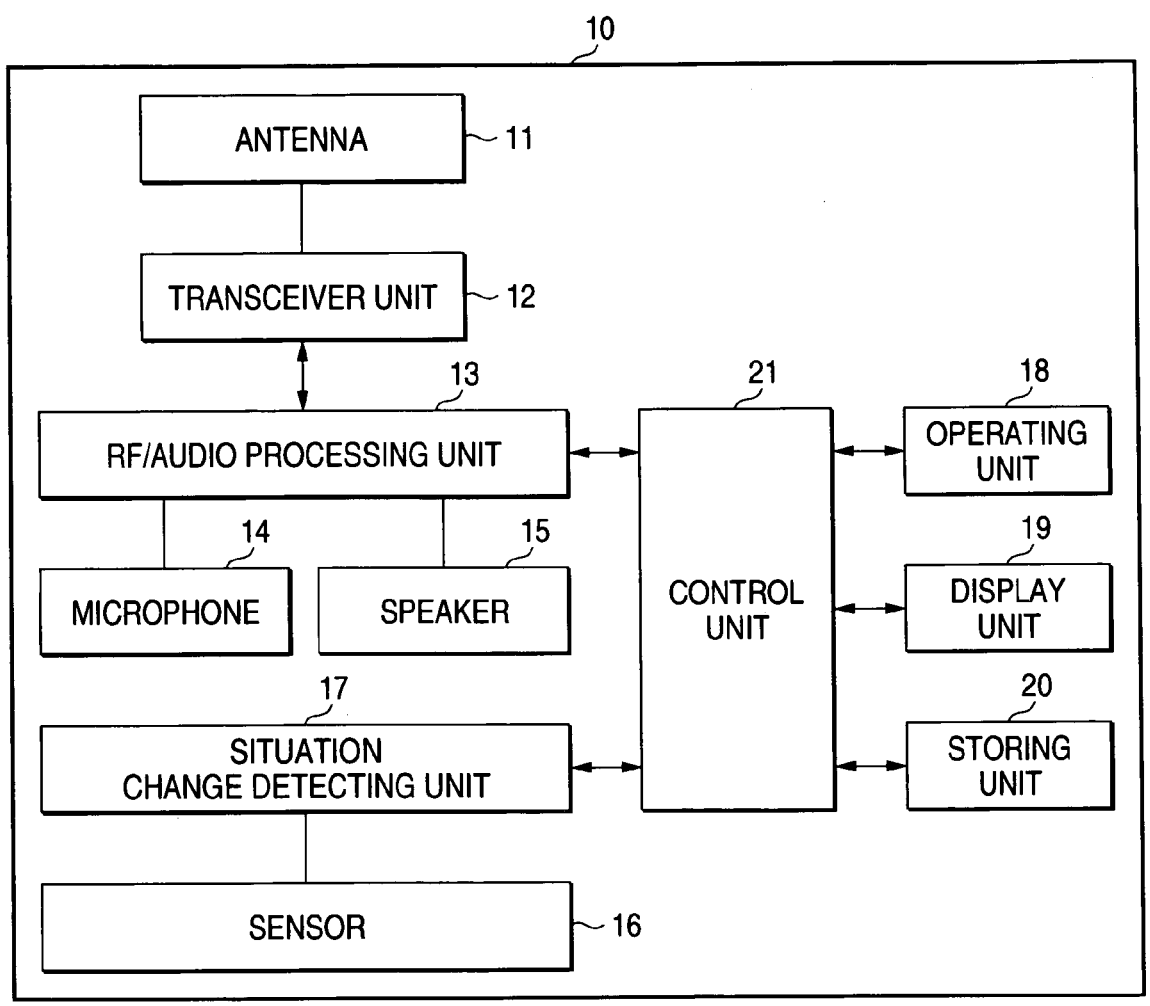
FIG. 1 is a block diagram showing the configuration of a cellular phone device according to an embodiment of the present invention.

FIG. 1 is a block diagram showing an overall configuration of a cellular phone device according to this embodiment of the present invention.

In FIG. 1, the cellular phone device 10 of this embodiment includes an antenna 11, a transceiver unit 12, an RF/audio processing unit 13, a microphone 14, a speaker 15, a sensor 16, a situation change detecting unit 17, an operating unit 18, a display unit 19, a storing unit 20, and a control unit 21.

The transceiver unit 12 communicates a radio signal having a predetermined frequency band with a base station (not shown) through the antenna 11.

The RF/audio processing unit 13 executes a variety of processes, such as modulation and demodulation of the radio signal transmitted and received by the transceiver unit 12 or decision and classification of various data, demodulation of separated sound data, and an output of demodulated data to the speaker 15, or modulation sound data acquired from the microphone 14.

The microphone 14 collects sound from the outside, converts collected sound into an electrical signal, and sends the converted sound signal to the RF/audio processing unit 13.

The speaker 15 serves to reproduce the sound signal outputted from the RF/audio processing unit 13 and outputs a voice of a speech destination or incoming call sound.

The sensor 16 converts an external situation into an electrical signal and outputs the signal to the situation change detecting unit 17. If a change occurs in external situation, the sensor 16 converts the electrical signal and outputs the converted signal to the situation change detecting unit 17.

The situation change detecting unit 17 receives the electrical signal from the sensor 16. If the received electrical signal has been changed, the detecting unit 17 detects that a change has occurred in external situation and informs the control unit 21 of the fact that the change has occurred in external situation.

The operating unit 18 includes numeric keys or character keys, various functional keys, and the like. The operating unit 18 is used for various operations, such as the input of telephone numbers or characters, telephone number setting, incoming call sound setting, incoming call volume, and mail account setting.

The display unit 19 displays data inputted from the operating unit 18, a state of a function during operation, or the like.

The storing unit 20 is a memory that stores various kinds of information including control programs of the control unit 21, or temporarily stores various data used for processes by the control unit 21.

The storing unit 20 also stores various setting inputted by the operating unit 18. In this embodiment of the present invention, since a telephone number and a mail account can be set differently with respect to a business use and a personal use, the storing unit 20 stores them separately. That is, in this embodiment of the present invention, the storing unit 20 can store a plurality of telephone number setting and mail account setting.

The control unit 21 is connected to the respective parts of the cellular phone device 10 so as to execute the entire control operation of the cellular phone device 10. The control unit 21 executes various control operations, such as the input of various instructions through the operating unit 18, controls of transmission and reception in the transceiver unit 12, controls of various processes in the RF/audio processing unit 13, and transmission control of incoming call notification sound of telephone and mail. The control unit 21 also controls the change of function and setting of the cellular phone device 10 based on an output result of a detection signal from the situation change detecting unit 17.

In this case, the change of function and setting, which is controlled by the control unit 21, can include the change of setting of a telephone number and a mail account from a business time use to a personal use when a business time zone is switched to a personal time zone, the change of setting of incoming call volume when the place of a user is changed, the change of a function corresponding to the change in setting, and the like.

Figure 2:
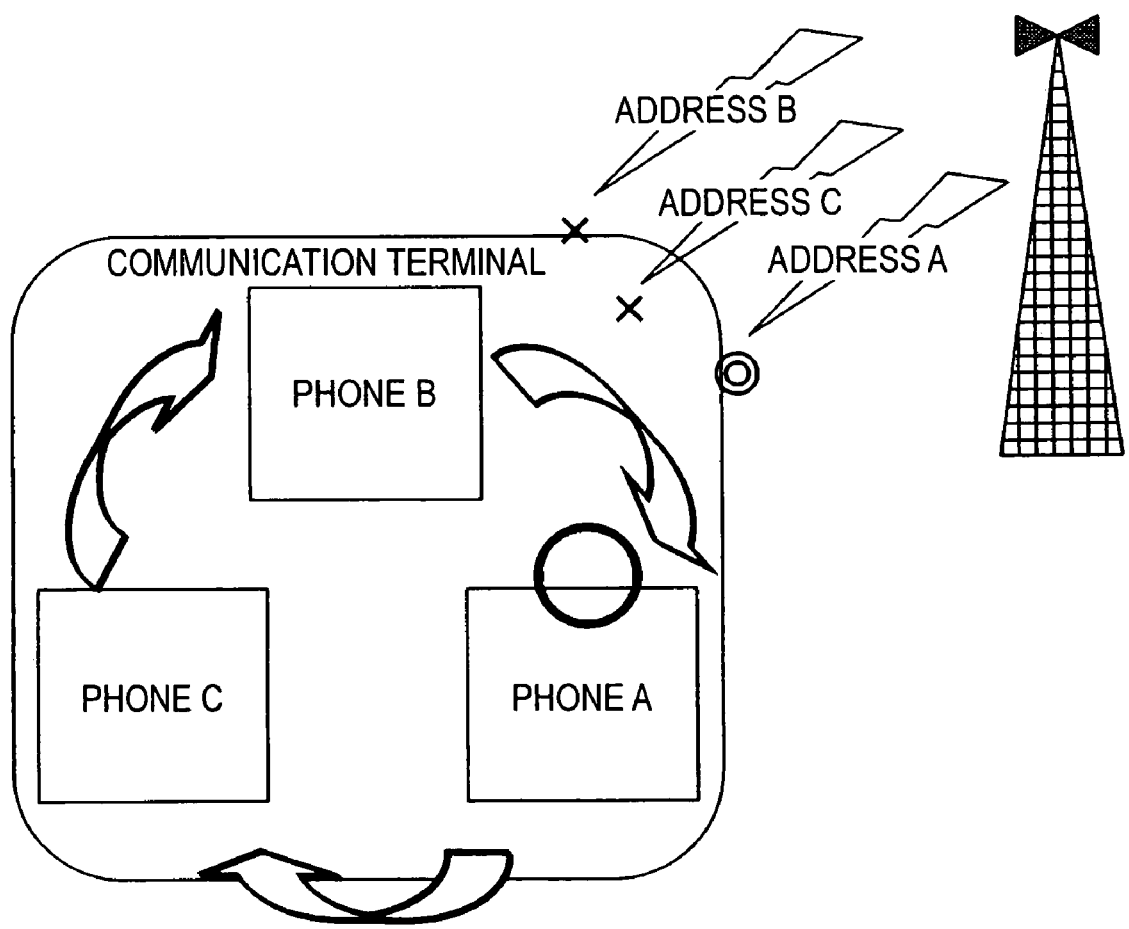
FIG. 2 is a diagram showing a transition image of a telephone number and an example that setting is changed under the control of a control unit in the embodiment of the present invention, which shows a normal mode.
Figure 3:
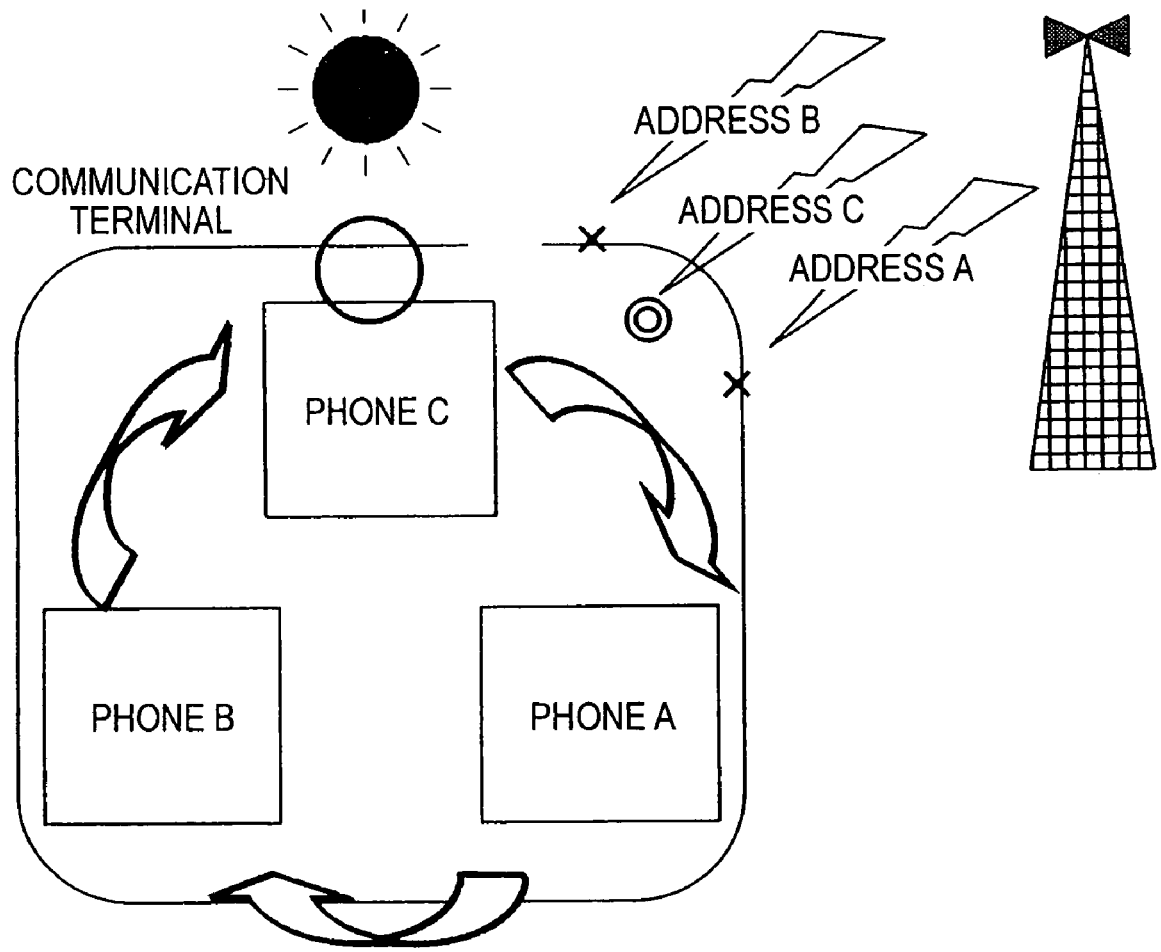
FIG. 3 is a diagram showing a transition image of a telephone number and an example that setting is changed under the control of a control unit in the embodiment of the present invention, which shows a day mode.
Figure 4:
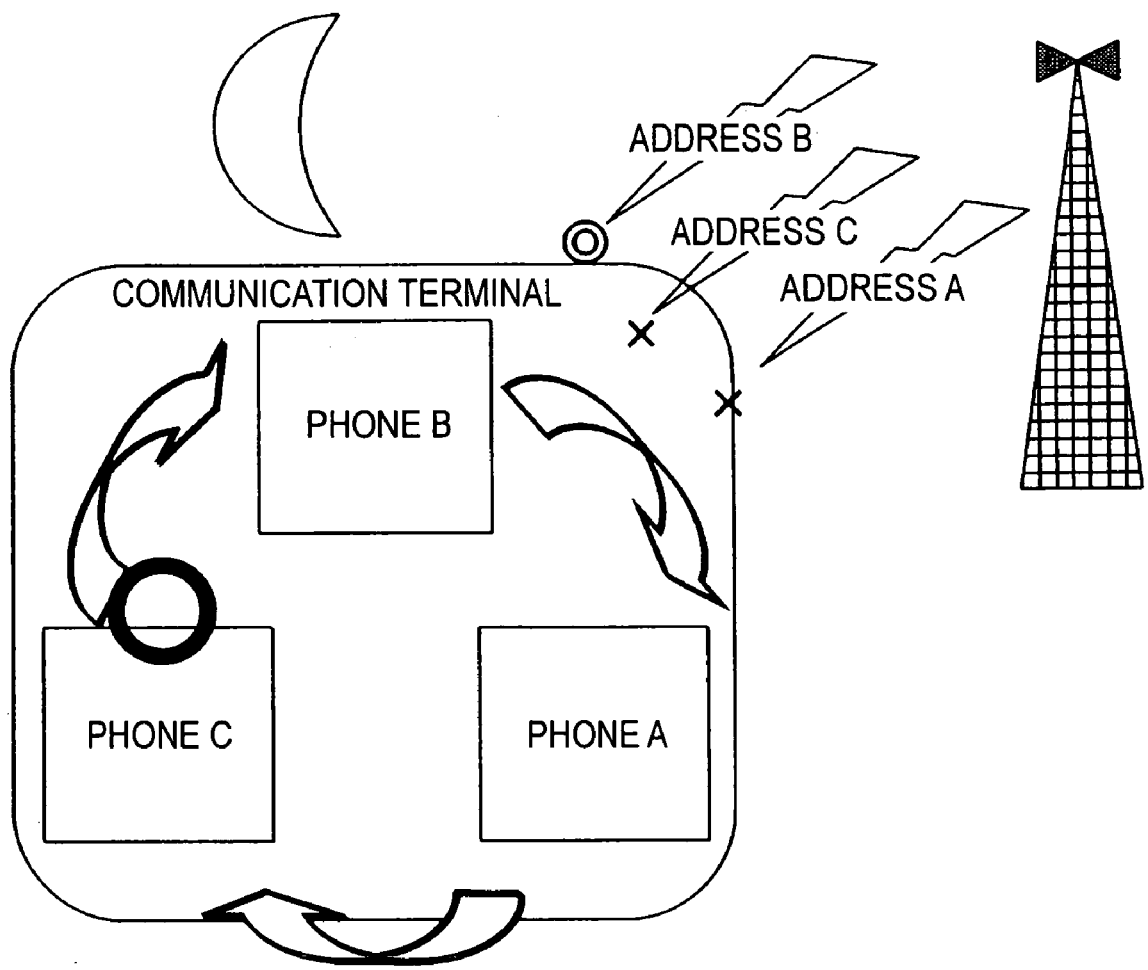
FIG. 4 is a diagram showing a transition image of a telephone number and an example that setting is changed under the control of a control unit in the embodiment of the present invention, which shows a night mode.

FIGS. 2 to 4 are diagrams showing a transition image of a telephone number and an example that setting is changed under the control of the control unit in this embodiment of the present invention. FIG. 2 shows a normal mode, FIG. 3 shows a day mode, and FIG. 4 shows a night mode.

The normal mode shown in FIG. 2 holds a telephone number A, the day mode shown in FIG. 3 holds a telephone number B, and the night mode shown in FIG. 4 holds a telephone number C.

Further, FIG. 5 is a diagram showing a transition image of a telephone number and an example that an account name, a telephone number, an electronic mail address, incoming call volume, incoming call sound, wallpaper, a color pattern, or the like is changed under the control of the control unit by situations in this embodiment of the present invention.

Hereinafter, the operation of the cellular phone device 10 upon the change in external situation around the control unit 21 according to this embodiment of the present invention will be described with reference to a flowchart of FIG. 6.

First, the sensor 16 acquires information on an external situation, converts the acquired information into an electrical signal, and transmits the converted signal to the situation change detecting unit 17 (Step S1).

The situation change detecting unit 17 analyzes the electrical signal received from the sensor 16 to determine whether or not a change has occurred in external situation (Step S2). If it is determined that the change has occurred (YES), the situation change detecting unit 17 transmits an external situation change detection signal to the control unit 21.

On the other hand, in the step S2, if it is determined that the change has not occurred (NO), the process returns to the step S1 so as to continuously acquire information on an external situation.

The control unit 21 reads out a function and setting corresponding to the external situation, which has been changed, from the storing unit 20 according to the external situation change detection signal received from the situation change detecting unit 17, and changes the setting of the cellular phone device 10 (Step S3).

For example, in the case where the setting of the cellular phone device 10 is set to α=x, β=y, and γ=z, the setting of the cellular phone device 10 is changed from α=x, β=y, and γ=z to α=x', β=y', and γ=z' since the change has occurred in external situation.

Next, the control unit 21 changes the function of the cellular phone device 10 (Step S4).

For example, in the case that the functions of the cellular phone device 10 are a function A and a function B corresponding to the setting α=x, β=y, and γ=z, the functions are changed to a function C and a function D corresponding to the setting α=x', β=y', and γ=z'.

The cellular phone device 10 operates according to the changed functions and setting (Step S5). Then, the process ends (Step S6).

As described above, the situation change detecting unit 17 detects the change in external situation and transmits the external situation change detection signal to the control unit 21.

If the external situation change detection signal is received from the situation change detecting unit 17, the control unit 21 reads out the functions and setting corresponding to the changed external situation from the storing unit 20 and automatically changes the functions and setting of the cellular phone device 10.

For this reason, when the external situation is changed, the functions and setting of the cellular phone device can be automatically changed according to the change.

Further, the control unit 21 can change only the functions or setting according to the external situation change detection signal.

The external situations can include various situations. As the sensor 16 that acquires information on various external situations, various kinds of sensors can be used according to acquired information. Examples 1 to 9 will be described below in detail as examples of the external situations.

EXAMPLE 1

Example 1 corresponds to an example that switching from the business time zone to the personal time zone is detected, and a telephone number, a mail address, incoming call volume, incoming call sound, or the like is automatically changed from the business use to the personal use.

Figure 7:
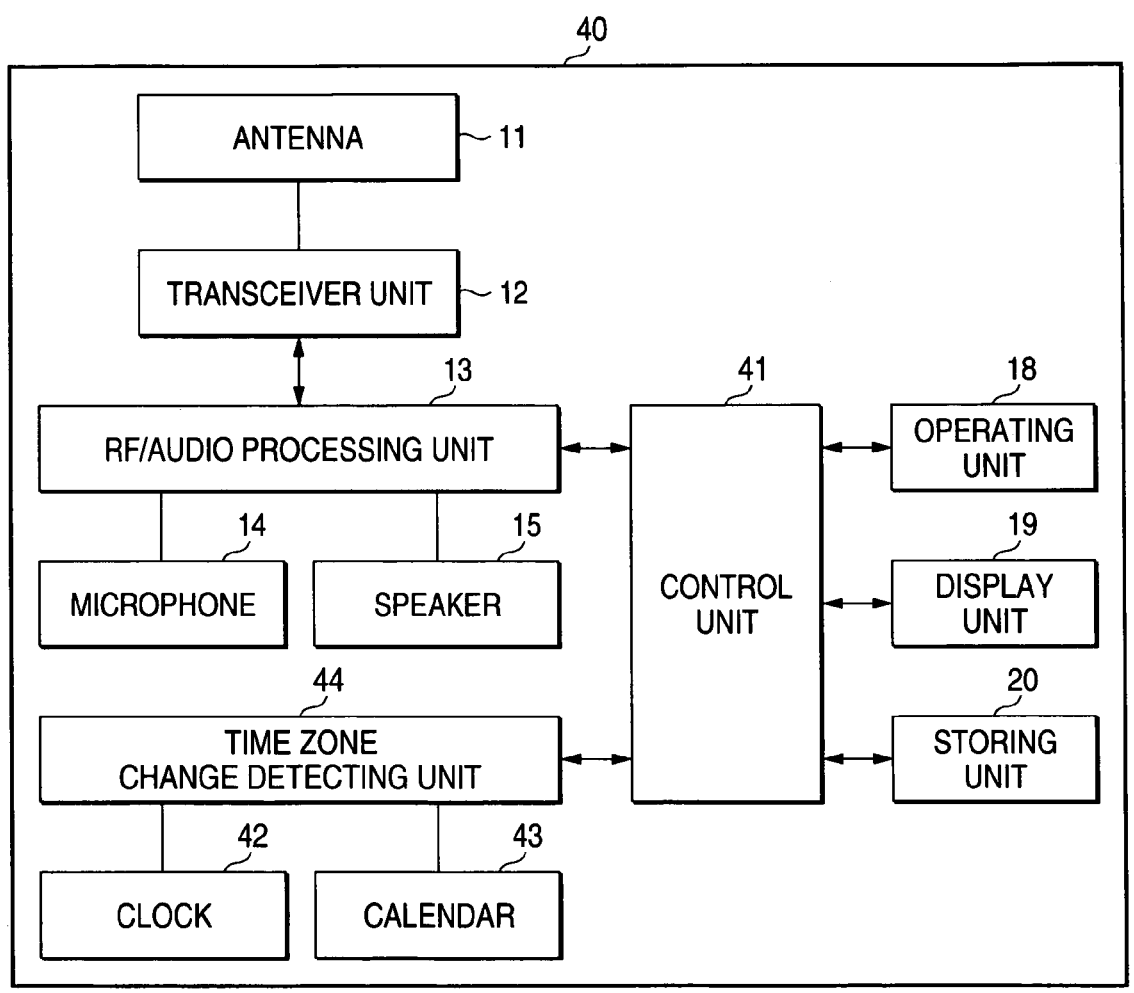
FIG. 7 is a block diagram showing the configuration of a cellular phone device in Example 1 of embodiment of the present invention.

FIG. 7 is a block diagram showing the configuration of a cellular phone device 40 according to this example.

The cellular phone device 40 of Example 1 uses a clock 42 and a calendar 43 as the sensor in the configuration of the cellular phone device 10 shown in FIG. 1. In this example, a time zone change detecting unit 44 is provided as a situation change detecting means. Moreover, the same parts as those of the cellular phone device 10 shown in FIG. 1 are represented by the same reference numerals and the descriptions thereof will be omitted.

The time zone change detecting unit 44 acquires current time from the clock 42, acquires a current date and a day of the week from the calendar 43, and determines whether acquired time belongs to the business time zone or the personal time zone, which have been previously set. If it is determined that the time zone has been changed, the time zone change detecting unit 44 transmits a time zone change detection signal to a control unit 41.

If the time zone change detection signal is received from the time zone change detecting unit 44, the control unit 41 reads out a telephone number, a mail address, incoming call volume, incoming call sound, and the like of the business time zone or the personal time zone from the storing unit 20, and changes the setting of the cellular phone device 40, such as a telephone number, a mail address, incoming call volume, incoming call sound, or the like, for use in the changed time zone.

Further, the control unit 41 controls the function of the cellular phone device 40 to be changed to a function corresponding to the setting, such as the telephone number, the mail address, incoming call volume, incoming call sound, or the like after change. In this case, the change examples of the functions can include the following changes.

(1) Schedule: a function of notifying presence of a tack through alarm or the like at a designated time when the task is recorded in the calendar.

As an exemplary change, a schedule that is first informed can be changed from "a task that should be performed in business time" to "a task that should be performed in personal life".

(2) Dictionary: a function of displaying conversion candidates or input prediction candidates when a sentence is written by e-mail or the like.

As an exemplary change, a candidate catalog that is first displayed can be changed from "words and phrases, and sentences in business time" to "words and phrases, and sentences in personal life".

(3) Application Genre: a function of grouping and managing application groups that have been classified by purposes.

As an exemplary change, an application genre catalog that is first used can be changed from "an application genre used in business time "to"an application genre necessary for personal life".

Figure 8:
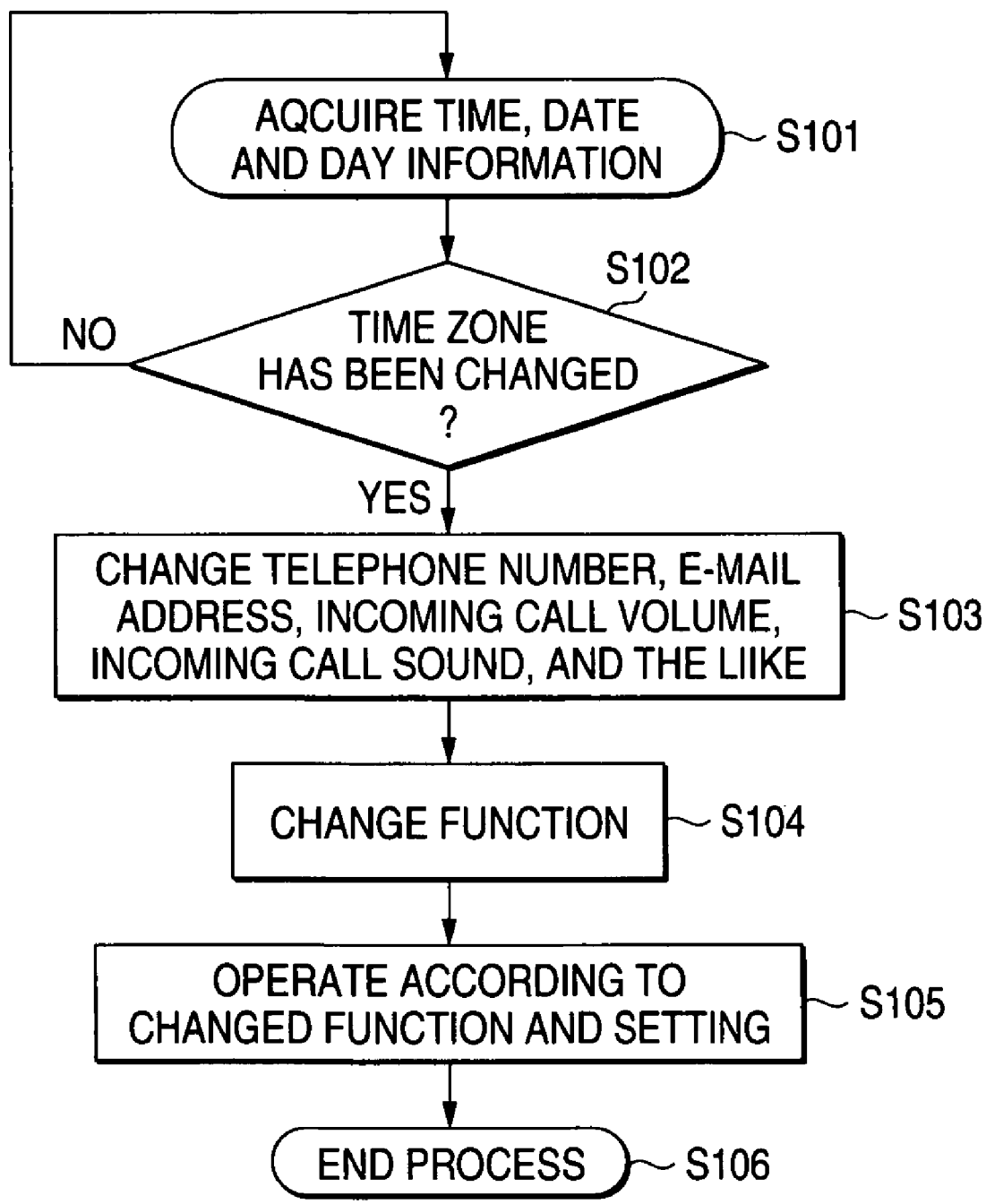
FIG. 8 is a flowchart illustrating the operation of Example 1.

FIG. 8 is a flowchart illustrating the operation of the cellular phone device 40 when a time zone is changed.

First, the clock 42 acquires current time. The calendar 43 acquires a current date and a day of the week (Step S101).

The time zone change detecting unit 44 determines whether acquired time belongs to the business time zone or the personal time zone, which have been previously set (Step S102). If it is determined that the time zone has been changed (YES), the time zone change detecting unit 44 transmits the time zone change detection signal to the control unit 41.

On the other hand, at the step S102, if it is determined that the time zone has not been changed (NO), the process returns to the step S101 in order to detect a change in time zone again.

The control unit 41 changes the setting of the cellular phone device 40, such as a telephone number, a mail address, incoming call volume, incoming call sound, or the like, according to the time zone change detection signal (Step S103).

Next, the control unit 41 changes the function of the cellular phone device 40 to a function corresponding to the setting (Step S104).

Accordingly, the cellular phone device 40 operates according to the changed function and setting (Step S105). Then, the process ends (Step S106).

As described above, in Example 1, it is determined whether the time zone has been changed based on current time acquired by the clock 42, and information on the business time zone or the personal time zone acquired by the calendar 43. If it is determined that the time zone has been changed, the setting of the cellular phone device 40, such as the telephone number, the mail address, incoming call volume, incoming call sound, or the like is changed.

Therefore, when the time zone is changed, the functions and setting of a cellular phone device can be automatically changed from the functions and setting for the business time zone to the functions and setting for the personal time zone, or vice versa.

EXAMPLE 2

Example 2 corresponds to an example that functions are differently set when a user having a cellular phone device takes exercise, such as jogging, and when normal. For example, this example shows an example that a change in body condition of a user is detected based on a change in pulse and body temperature, and a cellular phone number, a mail address, incoming call volume, incoming call sound, or the like is automatically changed.

Figure 9:
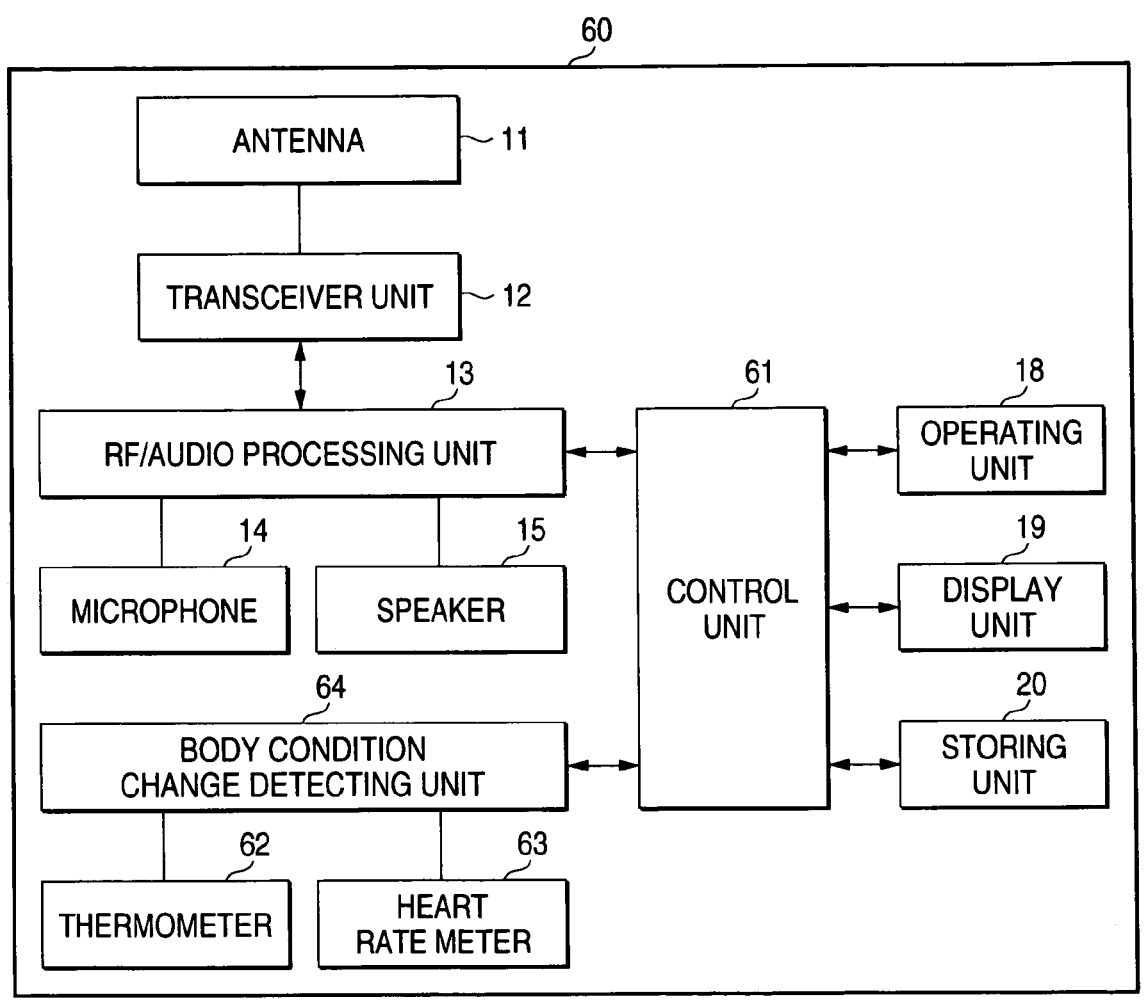
FIG. 9 is a block diagram showing the configuration of a cellular phone device in Example 2 of embodiment of the present invention.

FIG. 9 is a block diagram showing the configuration of a cellular phone device 60 according to the present example.

The cellular phone device 60 of Example 2 uses a thermometer 62 and a heart rate meter 63 as the sensor in the configuration of the cellular phone device 10 shown in FIG. 1. In this example, a body condition change detecting unit 64 is provided as a situation change detecting means. Moreover, the same parts as those of the cellular phone device 10 shown in FIG. 1 are represented by the same reference numerals and the descriptions thereof will be omitted.

The body condition change detecting unit 64 acquires a body temperature using the thermometer 62, and acquires a heart rate using the heart rate meter 63. If the body temperature or the heart rate is changed over an average value, the body condition change detecting unit 64 transmits a body condition change detection signal to a control unit 61.

If the body condition change detection signal is received from the body condition change detecting unit 64, the control unit 61 changes the setting of the cellular phone device 60, such as the telephone number, the mail address, incoming call volume, incoming call sound, or the like according to a recovery degree of a body (the changes in the heart rate and body temperature). The control unit 61 also controls the function of the cellular phone device 60 to be changed to a function corresponding to the setting, such as the telephone number, the mail address, incoming call volume, incoming call sound, or the like after the change.

Figure 10:
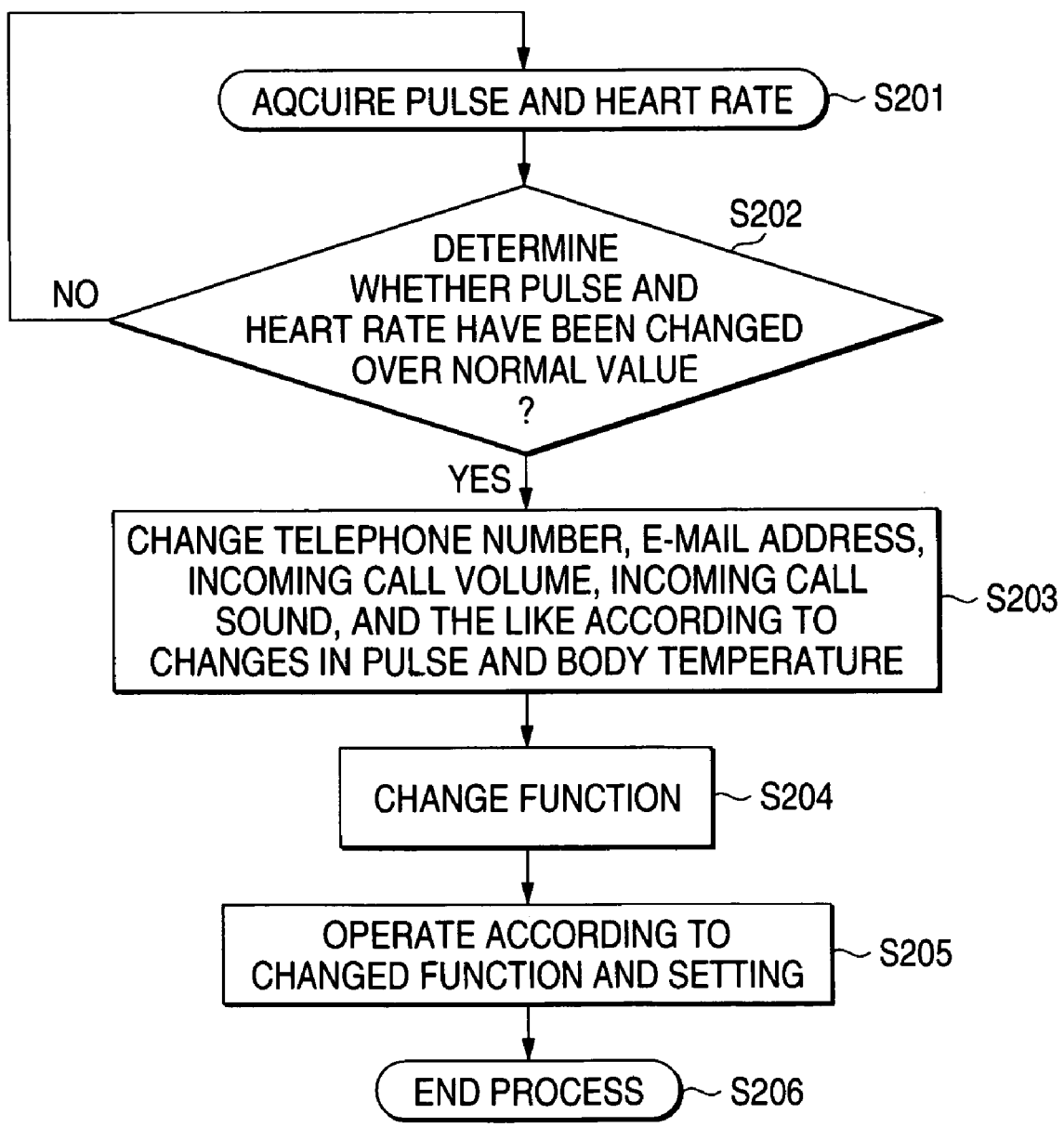
FIG. 10 is a flowchart illustrating the operation of Example 2.

FIG. 10 is a flowchart illustrating the operation of the cellular phone device 60 when a body condition is changed.

The body condition change detecting unit 64 acquires the body temperature using the thermometer 62 and acquires the heart rate using the heart rate meter 63 (Step S201).

Then, the body condition change detecting unit 64 determines whether or not the body temperature and the heart rate are changed exceeding a normal range (Step S202). If it is determined that the body temperature and the heart rate are changed exceeding the normal range (YES), the body condition change detecting unit 64 transmits the body condition change detection signal to the control unit 61 since the body condition has been changed.

On the other hand, at the step S202, if it is determined that the body temperature and the heart rate are within the normal range and there is no change in the body condition, the process returns the step S201.

The control unit 61 changes the setting of the cellular phone device 60, such as the telephone number, the mail address, incoming call volume, incoming call sound, or the like in response to the body condition change detection signal (step S203).

Next, the control unit 61 changes the function of the cellular phone device 60 to a function corresponding to the setting (Step S204).

Accordingly, the cellular phone device 60 operates according to the changed function and setting (Step S205). Then, the process ends (Step S206).

As described above, in Example 2, it is determined whether or not there is the a change in body condition according to the body temperature and heart rate, which are acquired through the thermometer 62 and the heart rate meter 63. If it is determined that there is the change in body condition, the setting of the cellular phone device 60, such as the telephone number, the mail address, incoming call volume, incoming call sound, or the like is changed based on the body condition (the changes in body temperature and the heart rate).

Accordingly, according to the body condition of the user when exercise and when normal, the functions and setting of the cellular phone device can be automatically set. Further, incoming call volume can be controlled to gradually come down according to a recovery degree of the body condition after exercise. It is thus possible to finely change the functions and setting of the cellular phone device according to a minute change of the body condition (the changes in body temperature and heart rate).

EXAMPLE 3

Example 3 corresponds to an example that incoming call volume is automatically switched to vibration mode when a cellular phone device is moved to a dark place, such as a pocket or the like.

Figure 11:
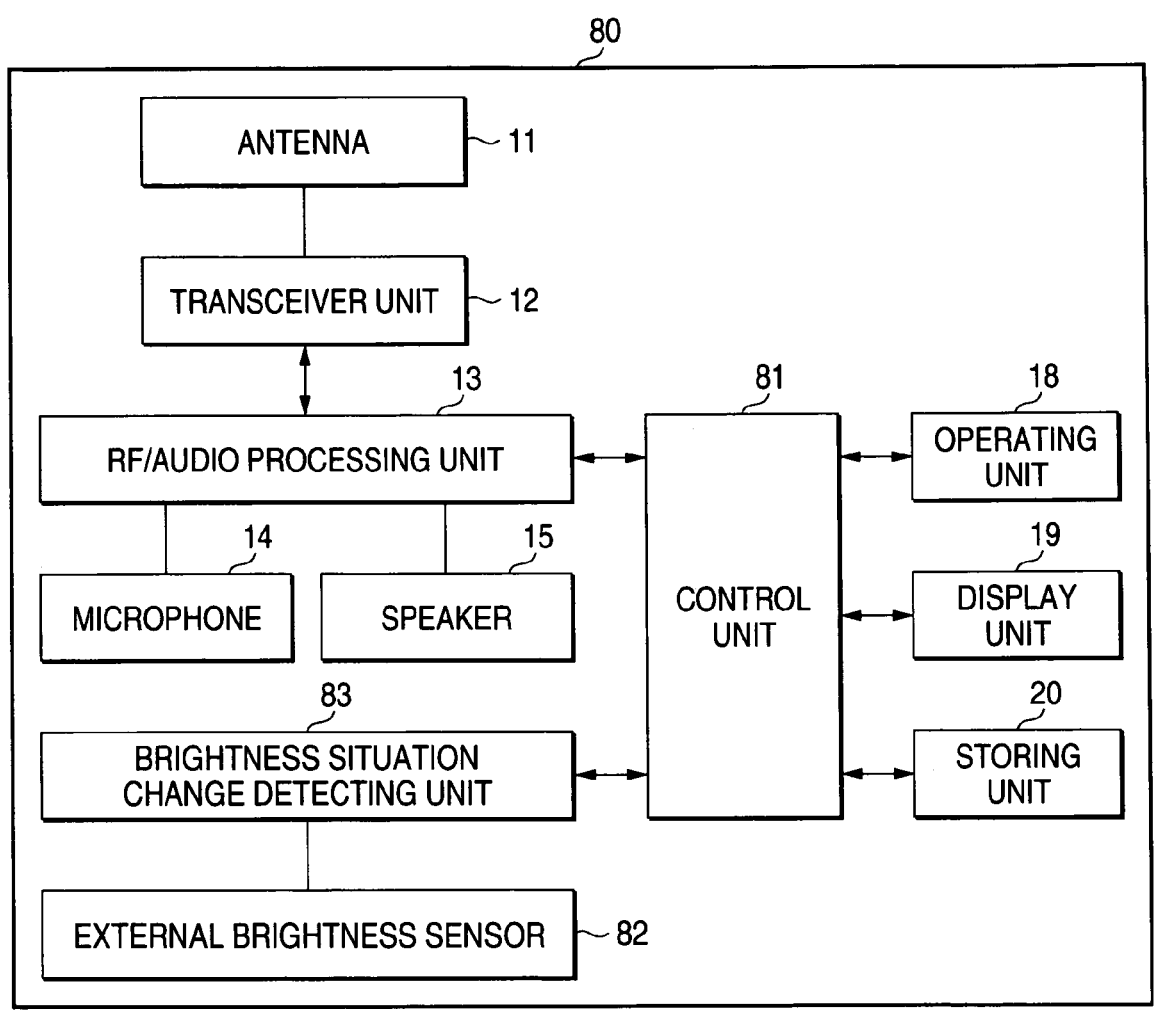
FIG. 11 is a block diagram showing the configuration of a cellular phone device in Example 3 of embodiment of the present invention.

FIG. 11 is a block diagram showing the configuration of a cellular phone device 80 according to the present example.

The cellular phone device 80 of Example 3 uses an external brightness sensor 82 as the sensor in the configuration of the cellular phone device 10 shown in FIG. 1. In this example, a brightness situation change detecting unit 83 is provided as a situation change detecting means. Moreover, the same parts as those of the cellular phone device 10 shown in FIG. 1 are represented by the same reference numerals and the descriptions thereof will be omitted.

The external brightness sensor 82 serves to convert external brightness into an electrical signal and transmits the converted electrical signal to the brightness situation change detecting unit 83.

The brightness situation change detecting unit 83 acquires a current external brightness value according to the electrical signal from the external brightness sensor 82. When external brightness indicated by the current external brightness value is darker than predetermined brightness, that is, a standard, the brightness situation change detecting unit 83 transmits a brightness situation change detection signal to the control unit 81.

If the brightness situation change detection signal is received from the brightness situation change detecting unit 83, a control unit 81 changes the setting of the cellular phone device 80, that is, changes the incoming call setting to the vibration mode. Next, the control unit 81 controls the function of the cellular phone device 80 to be changed to a function corresponding to the vibration mode after change.

Figure 12:
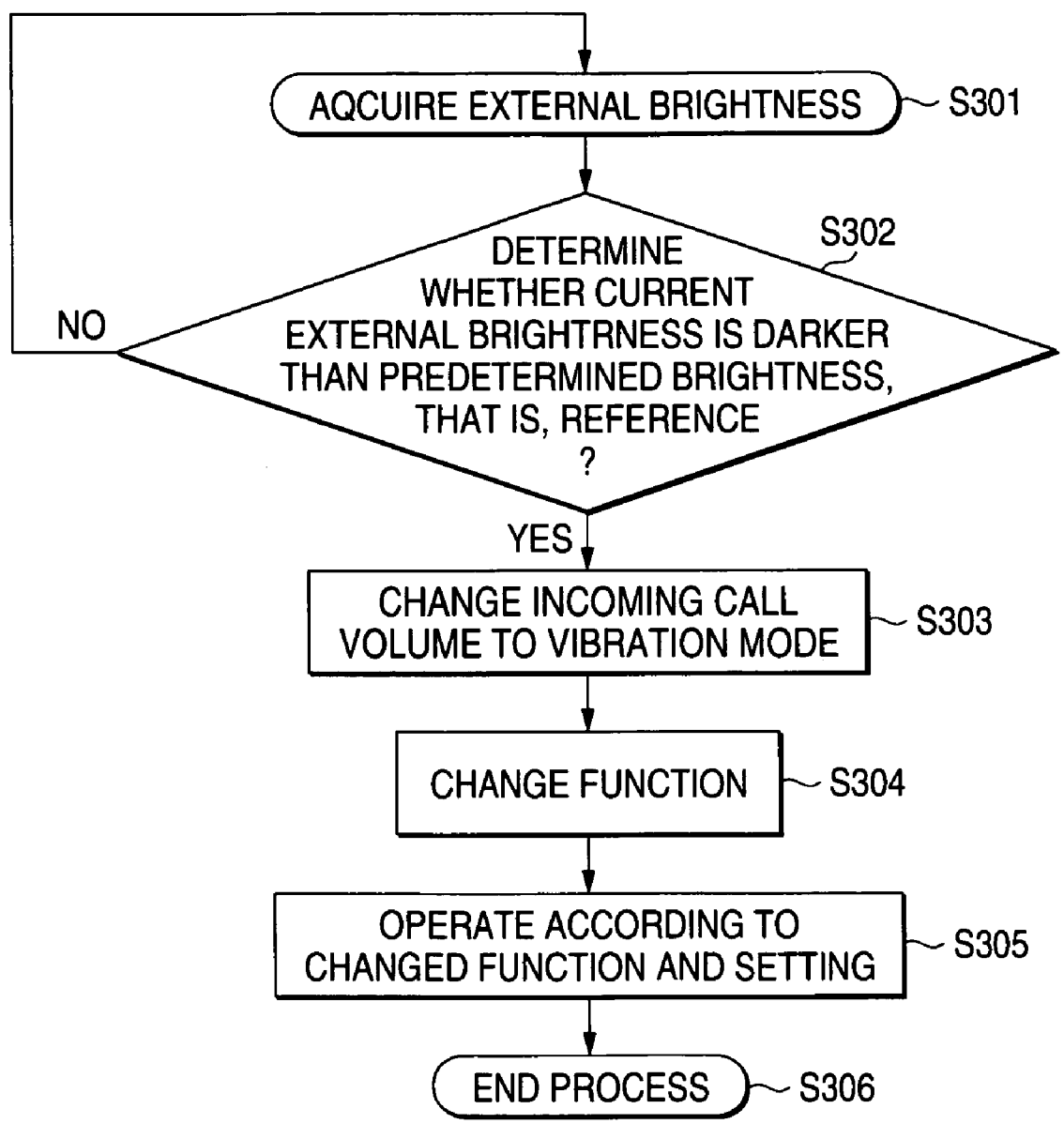
FIG. 12 is a flowchart illustrating the operation of Example 3.

FIG. 12 is a flowchart illustrating the operation of the cellular phone device 80 when a brightness situation is changed.

The brightness situation change detecting unit 83 acquires external brightness using the external brightness sensor 82 (Step S301).

Next, the brightness situation change detecting unit 83 determines whether or not current external brightness is darker than predetermined brightness, that is, a standard (Step S302). If it is determined that current external brightness is darker than predetermined brightness (YES), the brightness situation change detecting unit 83 transmits the brightness situation change detection signal to the control unit 81.

At the step S302, if it is determined that current external brightness is not darker than predetermined brightness (NO), the process returns to the step S301 so as to acquire current brightness from the external brightness sensor 82.

If the brightness situation change detection signal is received from the brightness situation change detecting unit 83, the control unit 81 changes the setting of the cellular phone device 80, that is, the incoming call setting to the vibration mode (Step S303). Next, the control unit 81 controls the function of the cellular phone device 80 to be changed to a function corresponding to the vibration mode after change (Step S304).

Accordingly, the cellular phone device 80 operates according to the changed function and setting (Step S305). Then, the process ends (Step S306).

As described above, in Example 3, it is determined whether or not current external brightness is darker than predetermined brightness, that is, the standard based on external brightness acquired by the external brightness sensor 82. If it is determined that external brightness value is darker than predetermined brightness, that is, the standard, the setting of the cellular phone device 80, that is, the incoming call setting is switched to the vibration mode.

Accordingly, when the cellular phone device is moved to the dark place, such as a pocket or the like, the incoming call setting of the cellular phone device can be automatically switched to the vibration mode.

EXAMPLE 4

Example 4 corresponds to an example that incoming call sound is automatically changed to silence or the supply of power to a cellular phone device stops when the cellular phone device is moved to a place where communication is not suitable, such as a conference room and a subway.

Figure 13:
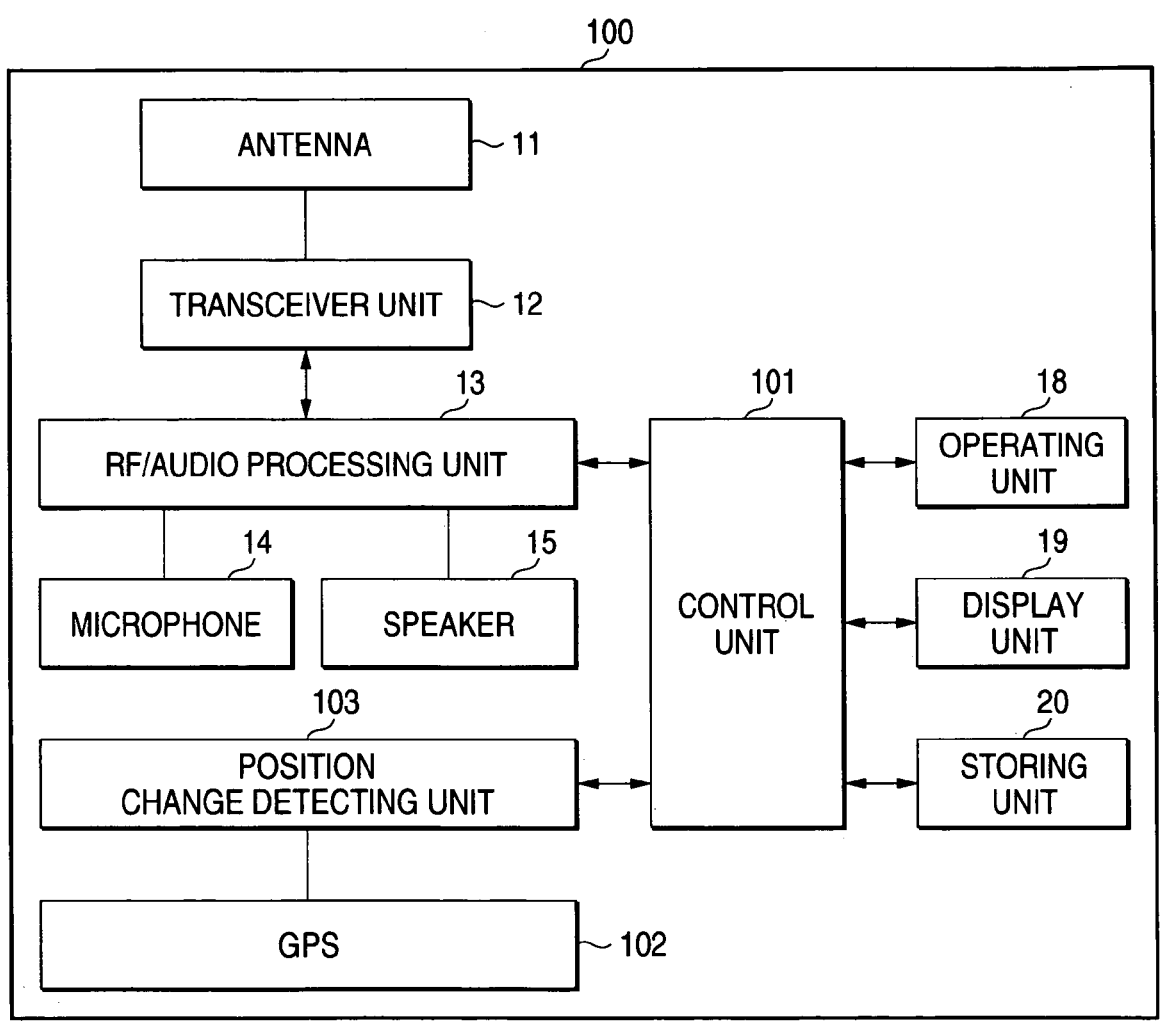
FIG. 13 is a block diagram showing the configuration of a cellular phone device in Example 4 of embodiment of the present invention.

FIG. 13 is a block diagram showing the configuration of a cellular phone device 100 according to the present example.

The cellular phone device 100 of Example 4 uses a Global Positioning System (GPS) 102 as the sensor in the configuration of the cellular phone device 10 shown in FIG. 1. In this example, a position change detecting unit 103 is provided as a situation change detecting means. Moreover, the same parts as those of the cellular phone device 10 shown in FIG. 1 are represented by the same reference numerals and the descriptions thereof will be omitted.

The GPS 102 receives a positional signal from a GPS satellite to detect a current location thereof.

The position change detecting unit 103 acquires information on the current location from the GPS 102. When the current location is a place where a communication is not suitable, such as a conference room and a subway, the position change detecting unit 103 transmits a position change detection signal to a control unit 101.

If the position change detection signal is received from the position change detecting unit 103, the control unit 101 changes the setting of the cellular phone device 100, such that incoming call sound becomes silent or the supply of power to the cellular phone device stops. The control unit 101 also controls the function of the cellular phone device 100 to be changed to a function corresponding to the setting after change.

Figure 14:
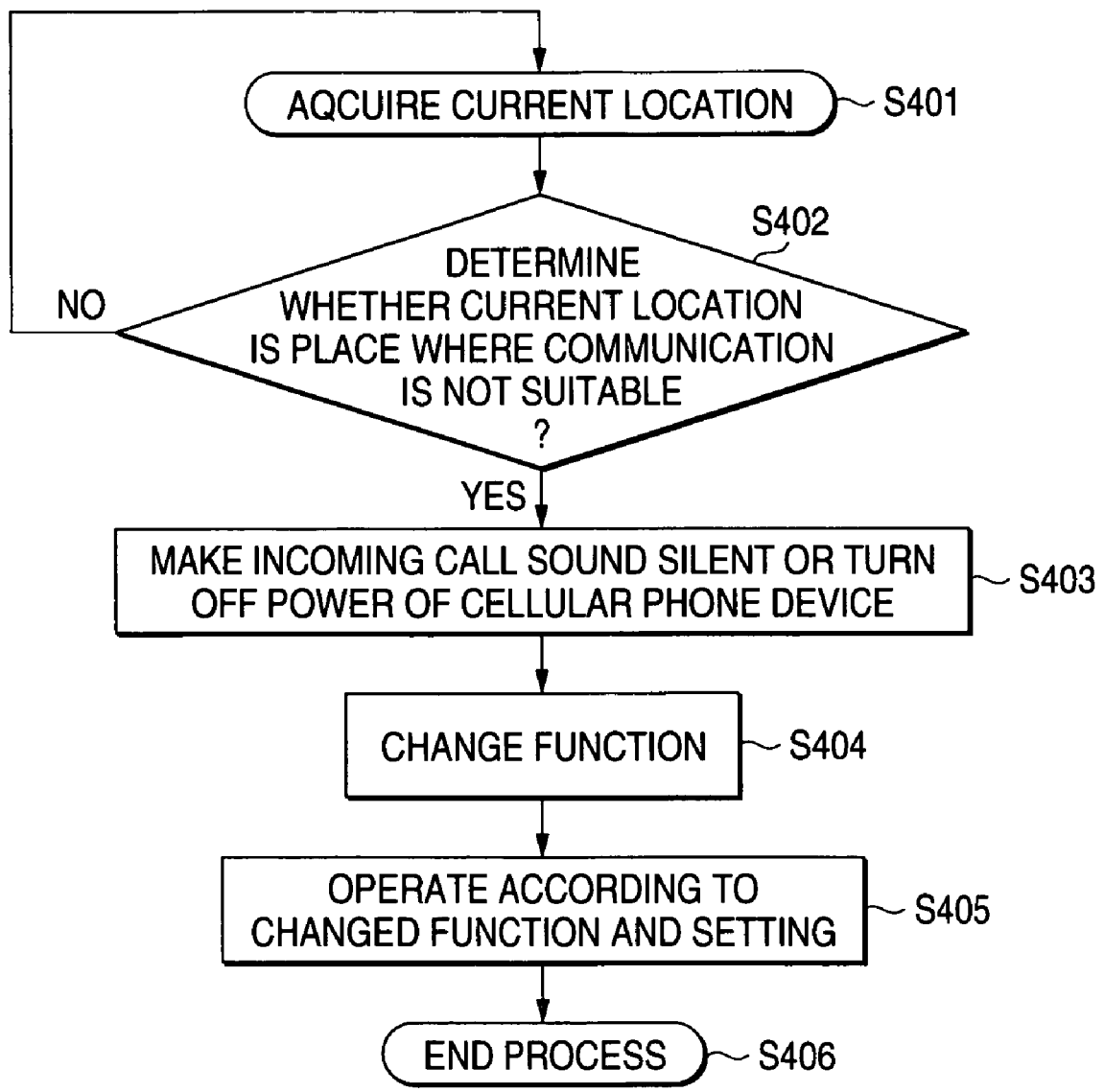
FIG. 14 is a flowchart illustrating the operation of Example 4.

FIG. 14 is a flowchart illustrating the operation of the cellular phone device 100 when a place is changed.

The position change detecting unit 103 acquires the current location from the GPS 102 (Step S401).

Next, the position change detecting unit 103 determines whether or not the current location is a place where communication is not suitable, such as a conference room or a subway (Step S402). If it is determined that the current location is the place where communication is not suitable, such as the conference room or the subway (YES), the position change detecting unit 103 transmits the position change detection signal to the control unit 101.

At the step S402, if it is determined that the current location is not a place at which communication is not suitable, unlike the conference room or the subway (a place at which communication is suitable) (NO), the process returns to the step S401 where the position change detecting unit 103 acquires the current location from the GPS 102.

If the position change detection signal is received from the position change detecting unit 103, the control unit 101 changes the setting of the cellular phone device 100, that is, such that that incoming call sound becomes silent or the supply of power to the cellular phone device stops (Step S403). The control unit 101 also changes the function of the cellular phone device 100 to a function corresponding to the setting after change (Step S404).

Accordingly, the cellular phone device 100 operates according to the changed function and setting (Step S405). Then, the process ends (Step S406).

As described above, in Example 4, it is determined whether or not a current location is a place where communication is not suitable, such as the conference room and the subway, based on positional information acquired from the GPS 102. If it is determined that the current location is a place where communication is not suitable, such as a conference room and subway, the setting of the cellular phone device 100 is changed, such that incoming call sound becomes silent or the supply of power to the cellular phone device 100 stops.

Accordingly, when a current location is a place where communication is not suitable, such as a conference room and subway, incoming call sound can become silent or the supply of power to the cellular phone device can stop automatically.

EXAMPLE 5

Example 5 corresponds to an example that a telephone number, a mail address, incoming call volume, incoming call sound, and the like are automatically changed according to a direction of an antenna of a cellular phone device (upward, downward, parallel direction, or the like).

Figure 15:
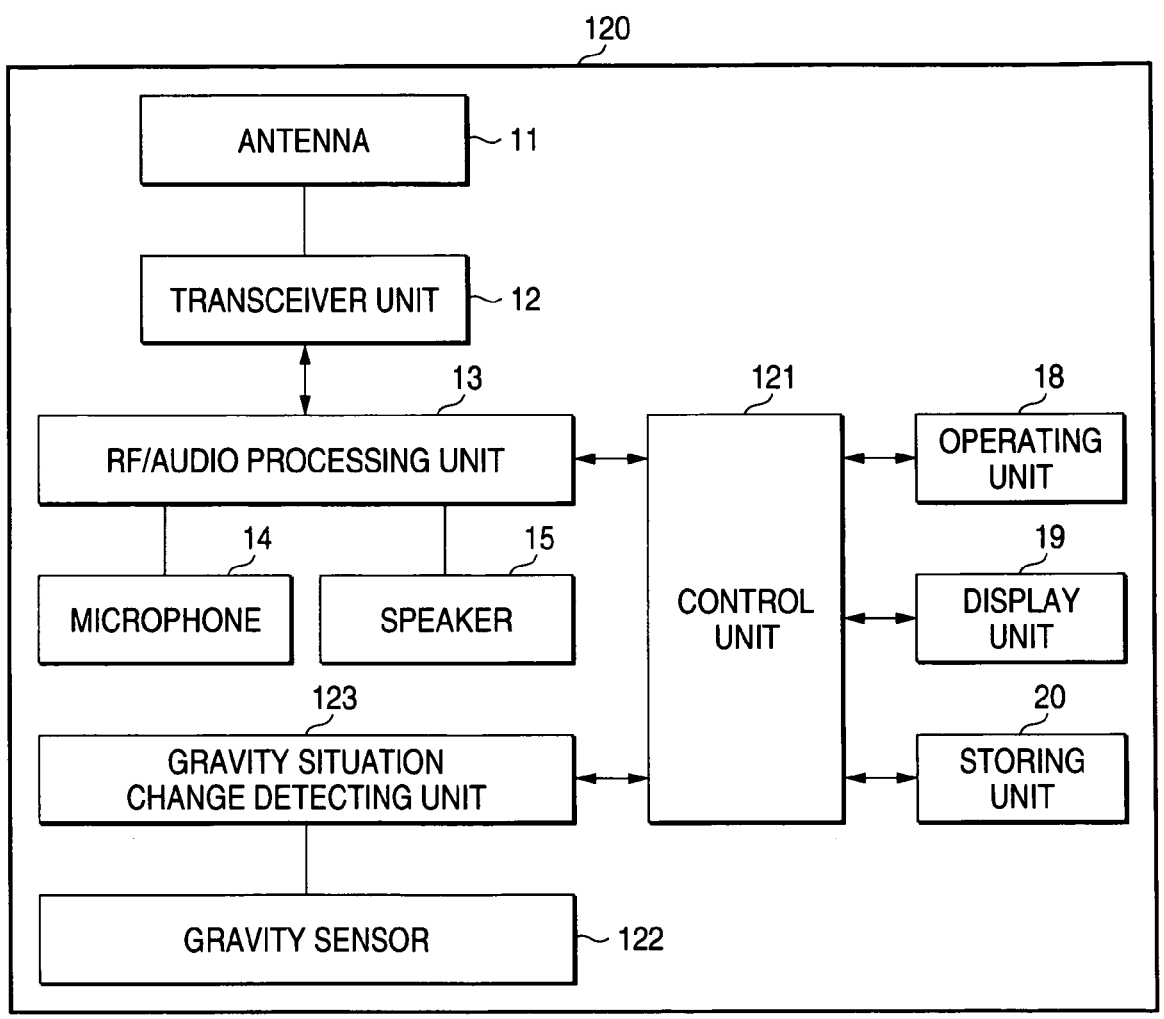
FIG. 15 is a block diagram showing the configuration of a cellular phone device in Example 5 of embodiment of the present invention.

FIG. 15 is a block diagram showing the configuration of a cellular phone device 120 according to the present example.

The cellular phone device 120 of Example 5 uses a gravity sensor 122 as the sensor in the configuration of the cellular phone device 10 shown in FIG. 1. In this example, a gravity situation change detecting unit 123 is provided as a situation change detecting means. Moreover, the same parts as those of the cellular phone device 10 shown in FIG. 1 are represented by the same reference numerals and the descriptions thereof will be omitted.

The gravity sensor 122 converts the gravity into an electrical signal. The converted electrical signal is transmitted to the gravity situation change detecting unit 123.

The gravity situation change detecting unit 123 acquires a gravity value from the gravity sensor 122. When the gravity value has been changed over a predetermined value, the gravity situation change detecting unit 123 transmits a gravity situation change detection signal to the control unit 121.

If the gravity situation change detection signal is received from the gravity situation change detecting unit 123, a control unit 121 changes the setting of the cellular phone device 120, that is, the telephone number, the mail address, incoming call volume, incoming call sound, or the like according to the direction of the cellular phone device 120. The control unit 121 also controls the function of the cellular phone device 120 to be changed to a function corresponding to the setting, such as the telephone number, the e-mail address, incoming call volume, incoming call sound, or the like after change.

Figure 16:
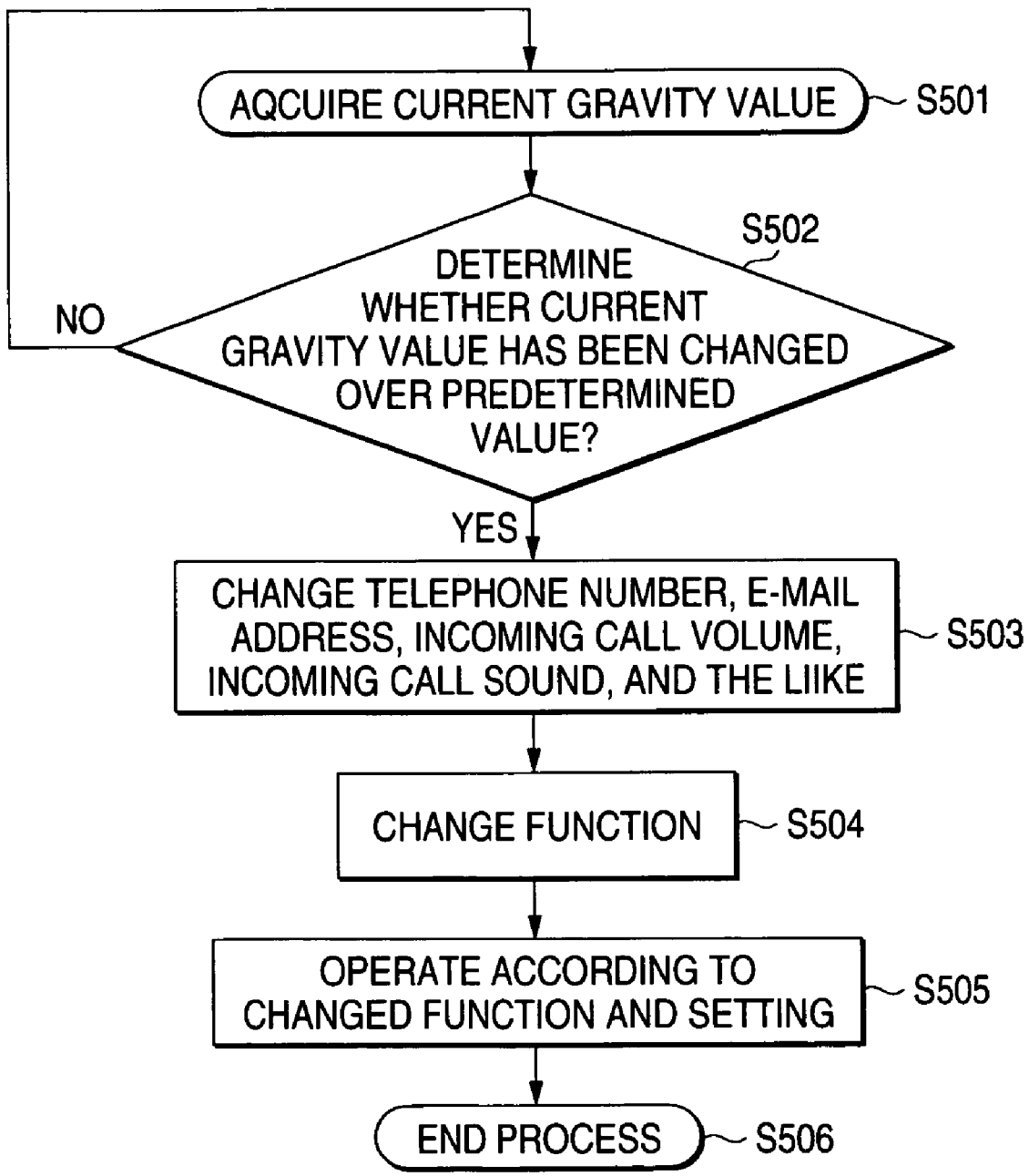
FIG. 16 is a flowchart illustrating the operation of Example 5.

FIG. 16 is a flowchart illustrating the operation of the cellular phone device 120 when gravity situations are changed.

The gravity situation change detecting unit 123 acquires a current gravity value from the gravity sensor 122 (Step S501). At this time, the gravity value can be acquired by measuring the gravity values of a longitudinal direction and other directions of the antenna. For example, by measuring a predetermined gravity in the longitudinal direction of the antenna, that is, an angle in a direction perpendicular to the longitudinal direction can be acquired. Further, by measuring gravity values of other directions, angles in directions perpendicular to other directions can be acquired. It is thus possible to know the direction of the antenna of the cellular phone device 120 (that is, it is possible to know that the direction of the cellular phone device 120 is upward, downward, parallel, or the like).

Next, the gravity situation change detecting unit 123 determines whether or not the current gravity value has been changed over a predetermined value (Step S502). If it is determined that the current gravity value has been changed over the predetermined value (YES), the gravity situation change detecting unit 123 transmits the gravity situation change detection signal to the control unit 121.

At the step S502, if it is determined that the current gravity value has not been changed from the predetermined value (NO), the process returns to the step S501 so as to acquire the current gravity value from the gravity sensor 122.

If the gravity situation change detection signal is received from the gravity situation change detecting unit 123, the control unit 121 changes the setting of the cellular phone device 120, such as the telephone number, the mail address, incoming call volume, incoming call sound, or the like according to the direction of the antenna of the cellular phone device 120 (Step S503). Next, the control unit 121 controls the function of the cellular phone device 120 to be changed to a function corresponding to the setting after change (Step S504).

Accordingly, the cellular phone device 120 operates according to the changed function and setting (Step S505). Then, the process ends (Step S506).

As described above, in Example 5, if it is determined that the current gravity value has been changed over the predetermined value based on the gravity value acquired by the gravity sensor 122, the setting of the cellular phone device 120, such as the telephone number, the mail address, incoming call volume, incoming call sound, or the like, is changed according to the direction of the cellular phone device 120.

Therefore, the telephone number, the mail address, incoming call volume, incoming call sound, or the like of the cellular phone device 120 can be automatically changed according to the direction of the cellular phone device (upward, downward, parallel direction, or the like).

EXAMPLE 6

Example 6 corresponds to an example that a telephone number, an e-mail address, incoming call volume, incoming call sound, or the like in a folding type cellular phone device is automatically changed according to an opening and closing degree thereof.

Figure 17:
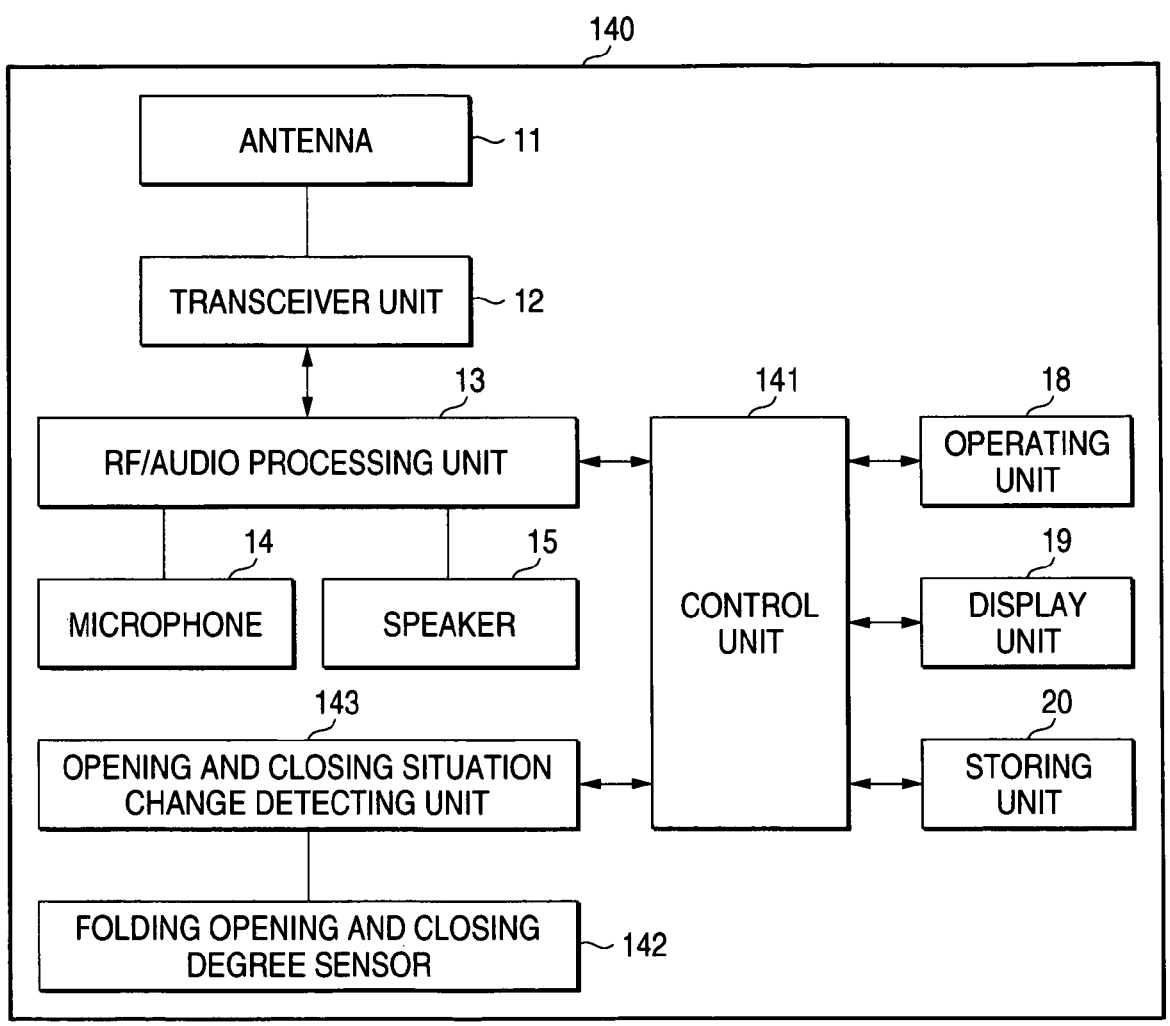
FIG. 17 is a block diagram showing the configuration of a cellular phone device in Example 6 of embodiment of the present invention.

FIG. 17 is a block diagram showing the configuration of a cellular phone device 140 according to the present example.

The cellular phone device 140 of Example 6 uses a folding opening and closing degree sensor 142 as the sensor in the configuration of the cellular phone device 10 shown in FIG. 1. In this example, an opening and closing situation change detecting unit 143 is provided as a situation change detecting means. Moreover, the same parts as those of the cellular phone device 10 shown in FIG. 1 are represented by the same reference numerals and the descriptions thereof will be omitted.

The folding opening and closing degree sensor 142 converts an opening and closing degree into an electrical signal, and then transmits a converted electrical signal to the opening and closing situation change detecting unit 143.

The opening and closing situation change detecting unit 143 receives the electrical signal indicating a current opening and closing degree from the folding opening and closing degree sensor 142. If the current opening and closing degree has been changed over a predetermined value, the opening and closing situation change detecting unit 143 transmits an opening and closing situation change detection signal to a control unit 141.

If the opening and closing situation change detection signal is received from the opening and closing situation change detecting unit 143, the control unit 141 changes setting of the cellular phone device 140, such as a telephone number, a mail address, incoming call volume, incoming call sound, or the like according to the opening and closing situation. The control unit 141 also controls the function of the cellular phone device 140 to be changed to a function corresponding to the setting, such as the telephone number, the e-mail address, incoming call volume, incoming call sound, or the like after change.

Figure 18:
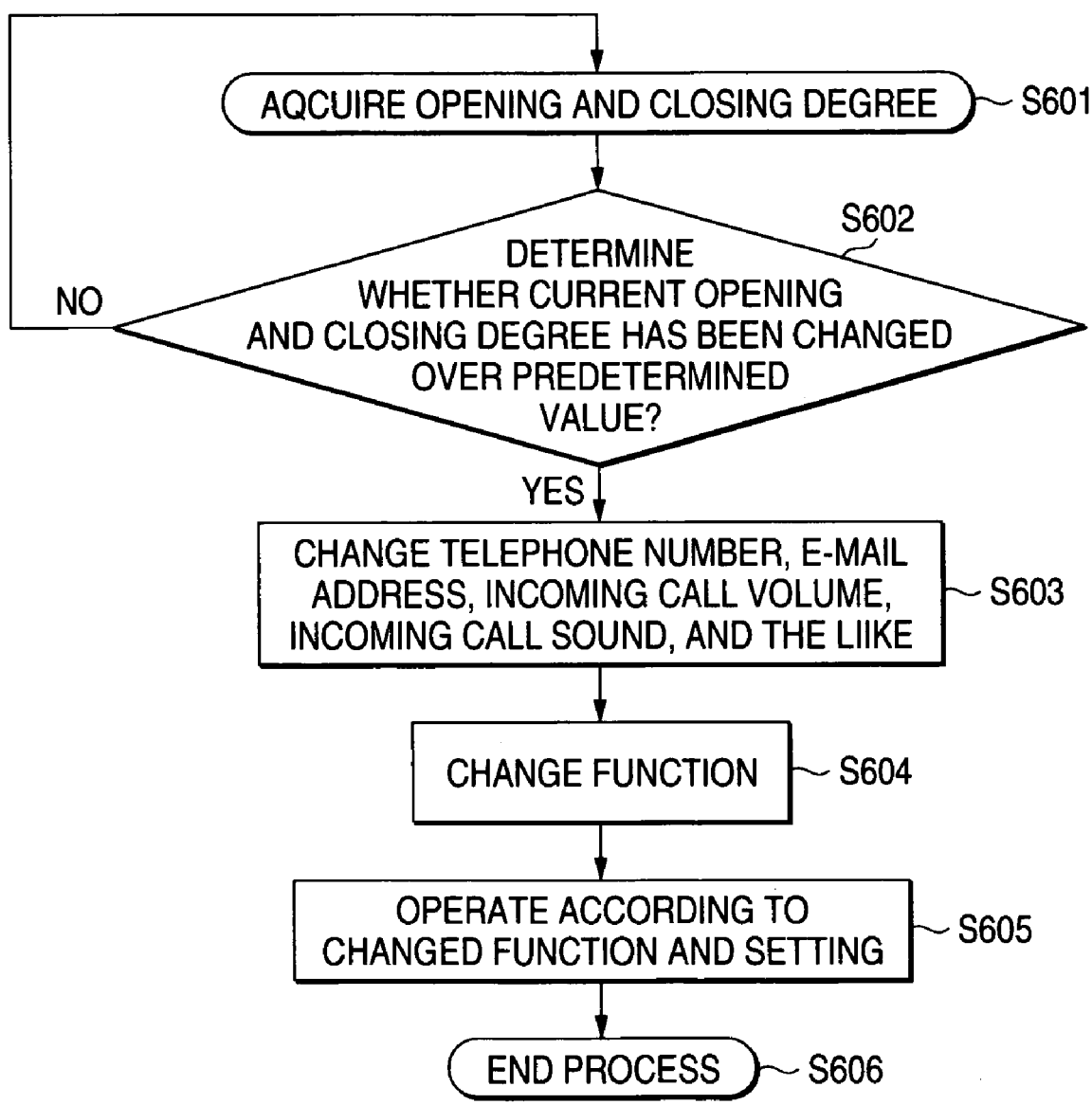
FIG. 18 is a flowchart illustrating the operation of Example 6.

FIG. 18 is a flowchart illustrating the operation of the cellular phone device 140 when the opening and closing situation of the folding type cellular phone device is changed.

The opening and closing situation change detecting unit 143 acquires the current opening and closing degree from the folding opening and closing degree sensor 142 (Step S601).

Next, the opening and closing situation change detecting unit 143 determines whether or not the current opening and closing degree has been changed over the predetermined value (Step S602). If it is determined that the current opening and closing degree has been changed over the predetermined value (YES), the opening and closing situation change detecting unit 143 transmits the opening and closing situation change detection signal to the control unit 141.

At the step S602, if it is determined that the current opening and closing degree has not been changed over the predetermined value (NO), the process returns to the step S601 so as to acquire the current opening and closing degree from the folding opening and closing degree sensor 142.

If the opening and closing situation change detection signal is received from the opening and closing situation change detecting unit 143, the control unit 141 changes the setting of the cellular phone device 140, such as the telephone number, the mail address, incoming call volume, incoming call sound, or the like according to the opening and closing situation (Step S603). Next, the control unit 141 controls the function of the cellular phone device 140 to be changed to a function corresponding to the setting after change (Step S604).

Accordingly, the cellular phone device 140 operates according to the changed function and setting (Step S605). Then, the process ends (Step S606).

As described above, in Example 6, it is determined whether or not the current opening and closing degree has been changed over the predetermined value based on the current opening and closing degree acquired by the folding opening and closing degree sensor 142. If it is determined that the current opening and closing degree has been changed over the predetermined value, the setting of the cellular phone device 140, such as the telephone number, the mail address, incoming call volume, incoming call sound, or the like is changed according to the opening and closing situation.

Therefore, in a folding type cellular phone device, when the opening and closing degree thereof is changed over the predetermined value, the telephone number, the mail address, incoming call volume, incoming call sound, or the like of the cellular phone device can be automatically changed according to the opening and closing situation.

EXAMPLE 7

Embodiment 7 corresponds to an example that a telephone number, a mail address, incoming call volume, incoming call sound, or the like is automatically changed by triggering an incoming call and the reception of a mail.

Figure 19:
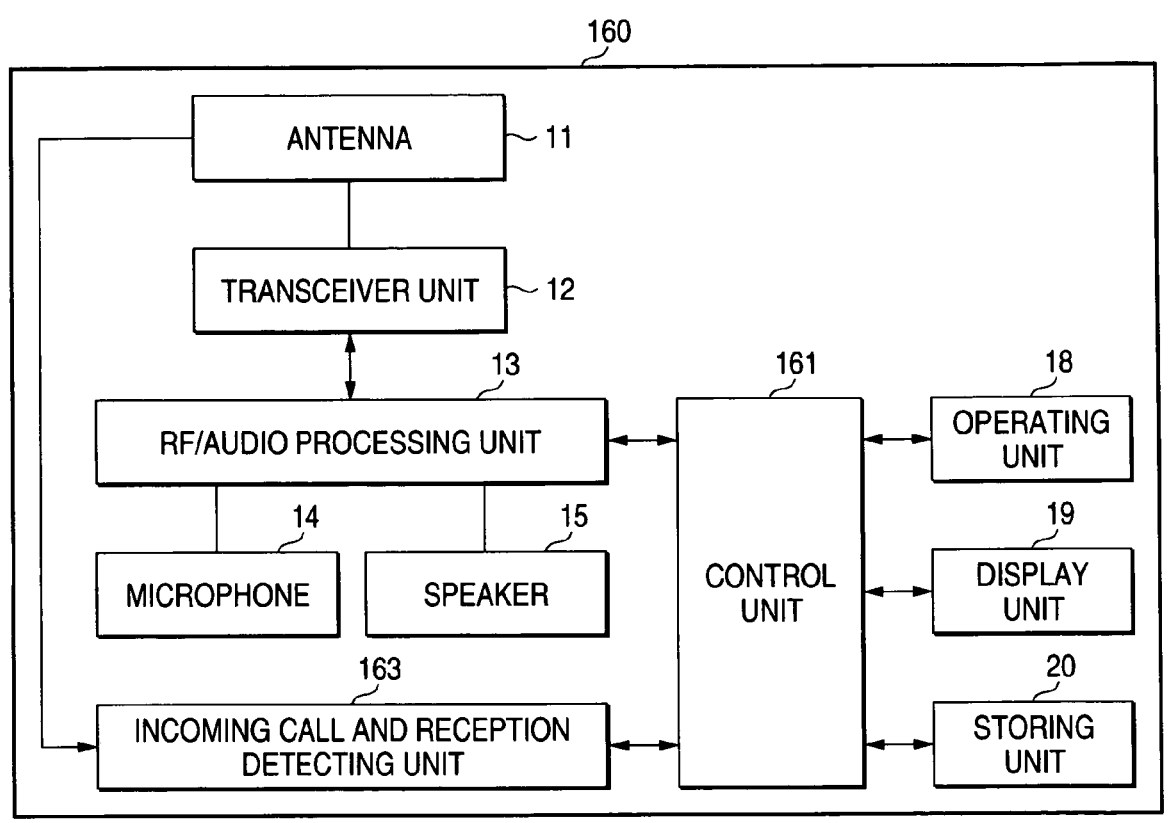
FIG. 19 is a block diagram showing the configuration of a cellular phone device in Example 7 of embodiment of the present invention.

FIG. 19 is a block diagram showing the configuration of a cellular phone device 160 according to the present example.

In the cellular phone device 160 of Example 7, an incoming call and reception detecting unit 162 is provided as a situation change detecting means, and the output of the antenna 11 is connected to the incoming call and reception detecting unit 162 in the configuration of the cellular phone device 10 shown in FIG. 1. Moreover, the same parts as those of the cellular phone device 10 shown in FIG. 1 are represented by the same reference numerals and the descriptions thereof will be omitted.

The incoming call and reception detecting unit 162 triggers an incoming call or the reception of a mail and then transmits an incoming call and reception detection signal to a control unit 161.

If the incoming call and reception detection signal is received from the incoming call and reception detecting unit 162, the control unit 161 changes the setting of the cellular phone device 160, such as, a telephone number, a mail address, incoming call volume, incoming call sound, or the like. The control unit 121 also controls the function of the cellular phone device 160 to be changed to a function corresponding to the setting, such as the telephone number, the mail address, incoming call volume incoming call sound, or the like after change.

Figure 20:
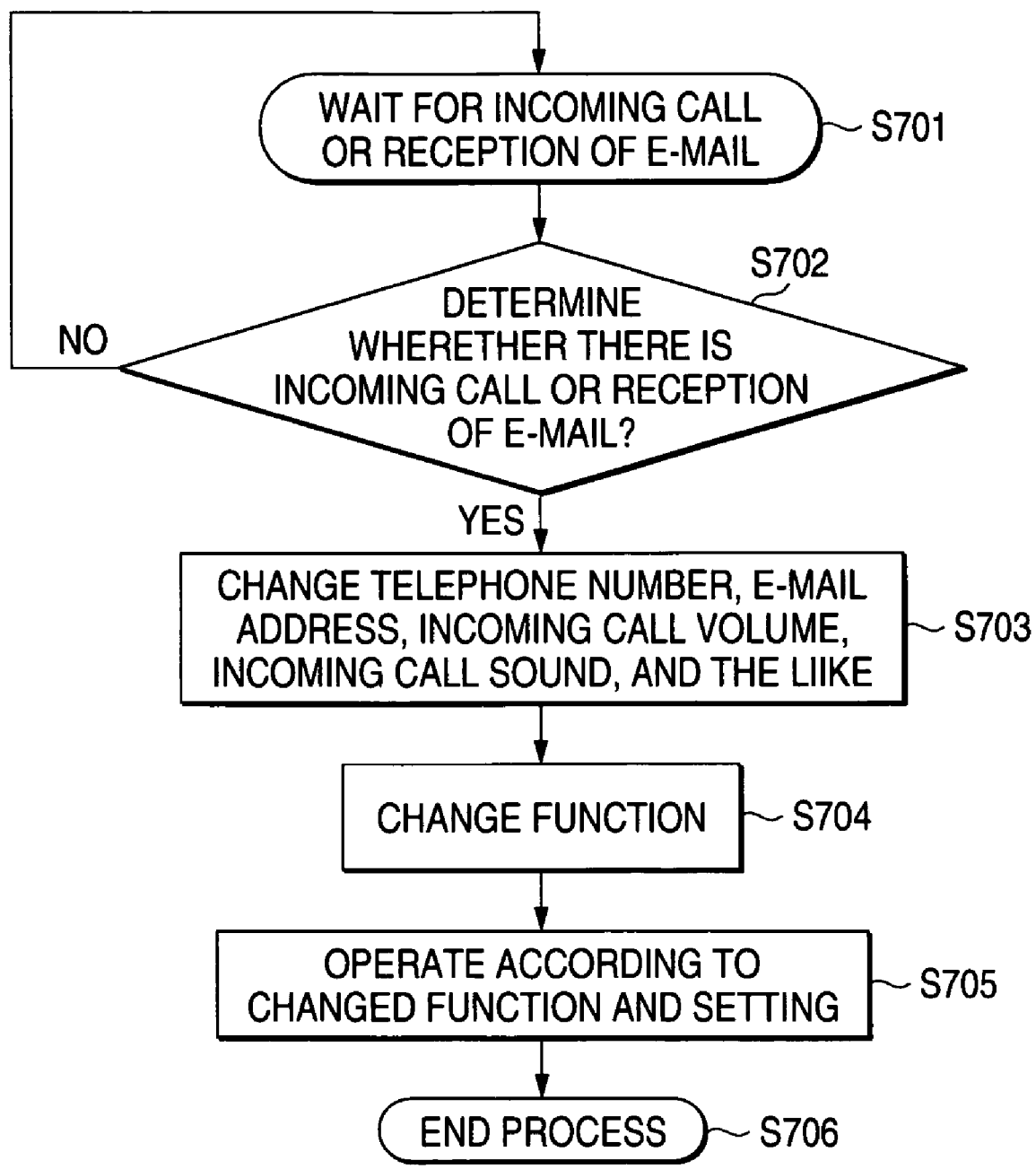
FIG. 20 is a flowchart illustrating the operation of Example 7.

FIG. 20 is a flowchart illustrating the operation of the cellular phone device 160 according to the reception of an incoming call or an electronic mail.

First, the cellular phone device 160 is in a standby state of receiving an incoming call or an electronic mail (Step S701). Next, the incoming call and reception detecting unit 162 determines whether or not there is an incoming call or reception of an electronic mail (Step S702). If it is determined that there is an incoming call or an electronic mail has been received (YES), the incoming call and reception detecting unit 162 transmits the incoming call and reception detection signal to the control unit 161.

If it is determined that there is no incoming call or reception of an electronic mail (NO), the process returns to the step S701 so as to wait for an incoming call or the reception of an electronic mail.

If the incoming call and reception detection signal is received from the incoming call and reception detecting unit 162, the control unit 161 changes the setting of the cellular phone device 160, such as the telephone number, the mail address, incoming call volume, incoming call sound, or the like (Step S703). Next, the control unit 161 controls the function of the cellular phone device 160 to be changed to a function corresponding to the setting, such as the telephone number, the e-mail address, incoming call volume, incoming call sound, or the like after change (Step S704).

Accordingly, the cellular phone device 160 operates according to the changed function and setting (Step S705). Then, the process ends (Step S706).

As described above, in Example 7, if there is an incoming call or reception of an electronic mail, the setting of the cellular phone device 160, such as the telephone number, the mail address, incoming call volume, incoming call sound, or the like is changed.

Therefore, by triggering the incoming call or the reception of an electronic mail, the telephone number, the mail address, incoming call volume, incoming call sound, or the like of a cellular phone device can be automatically changed.

EXAMPLE 8

Example 8 corresponds to an example that the function of a cellular phone device is automatically changed at previously registered time. For example, the cellular phone device can have a function of reducing volume from 1 a.m. to 6 a.m., which is thought to be asleep.

Figure 21:
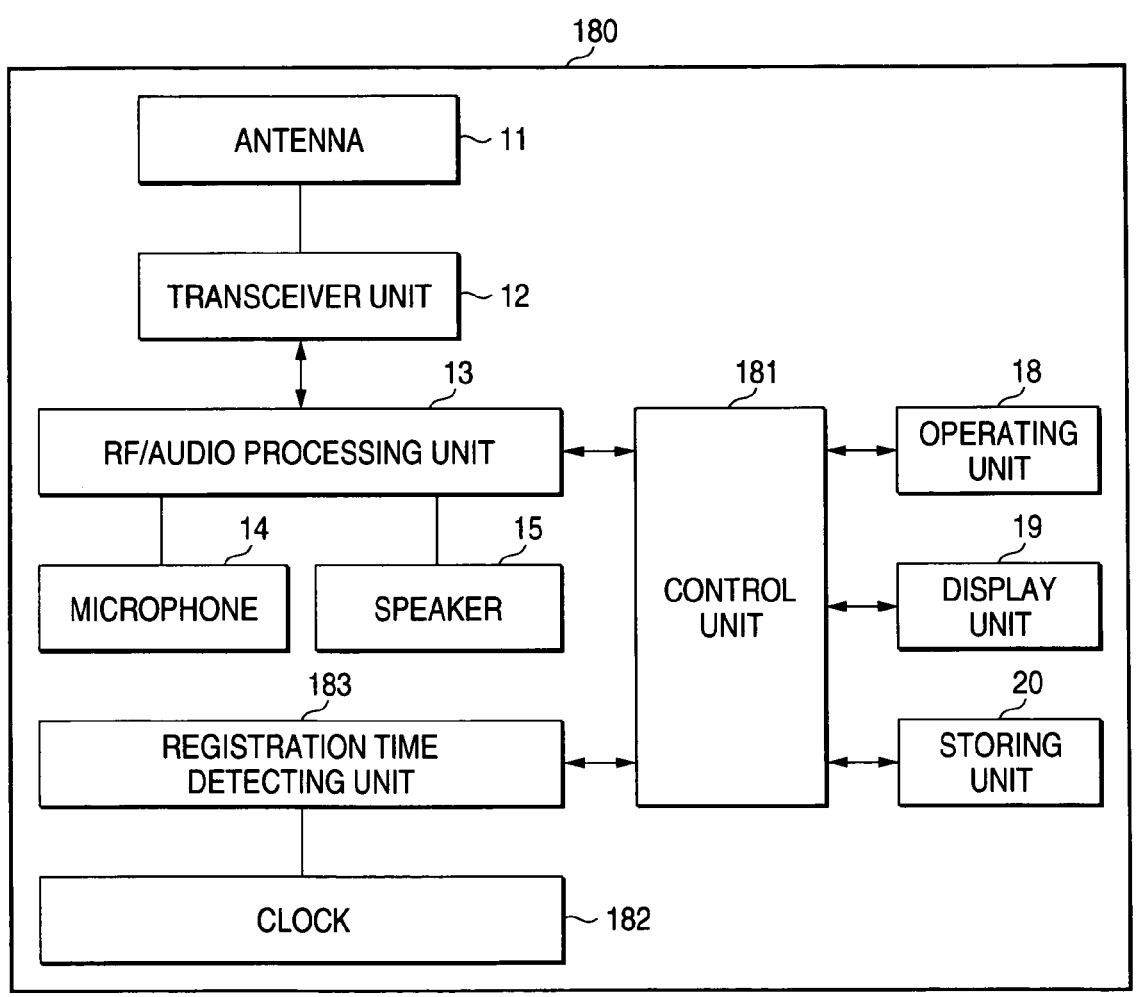
FIG. 21 is a block diagram showing the configuration of a cellular phone device in Example 8 of embodiment of the present invention.

FIG. 21 is a block diagram showing the configuration of a cellular phone device 180 according to the present example.

The cellular phone device 180 of Example 8 uses a clock 182 as the sensor in the configuration of the cellular phone device 10 shown in FIG. 1. In this example, a registration time detecting unit 183 is provided as a situation change detecting means. Moreover, the same parts as those of the cellular phone device 10 shown in FIG. 1 are represented by the same reference numerals and the descriptions thereof will be omitted.

The registration time detecting unit 183 acquires current time from the clock 182. When current time becomes time that has previously been registered, the registration time detecting unit 183 transmits a registration time detection signal to a control unit 181.

If the registration time detection signal is received from the registration time detecting unit 183, the control unit 181 changes the setting of the cellular phone device 180, that is, incoming call volume. The control unit 181 also controls the function of the cellular phone device 180 to be changed to a function corresponding to incoming call volume after change.

Figure 22:
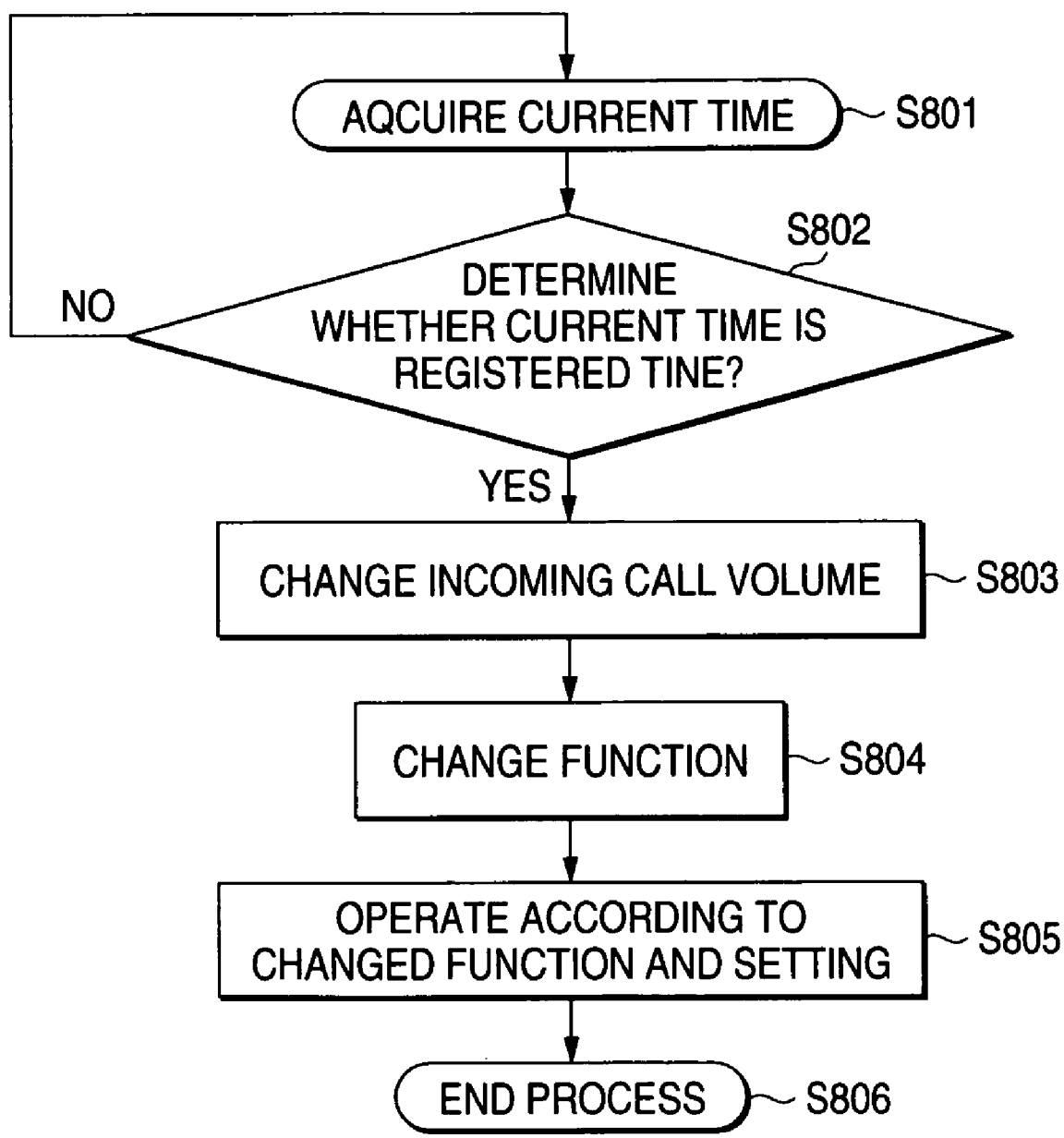
FIG. 22 is a flowchart illustrating the operation of Example 8.

FIG. 22 is a flowchart illustrating the operation of the cellular phone device 180 when current time becomes registered time.

First, the registration time detecting unit 183 acquires current time from the clock 182 (Step S801).

Next, the registration time detecting unit 183 determines whether or not current time is time that has been previously registered (Step S802). If it is determined that current time is time that has been previously registered (YES), the registration time detecting unit 183 transmits the registration time detection signal to the control unit 181.

At the step S802, if it is determined that the current time is not the time that has been previously registered (NO), the process returns to the step S801 so as to acquire current time.

If the registration time detection signal is received from the registration time detecting unit 183, the control unit 181 changes the setting of the cellular phone device 180, that is, incoming call volume (Step S803). Next, the control unit 181 controls the function of the cellular phone device 180 to be changed to a function corresponding to incoming call volume after change (Step S804).

Accordingly, the cellular phone device 180 operates according to the changed function and setting (Step S805). Then, the process ends (Step S806).

As described above, in Example 8, it is determined whether or not current time is time that has been previously registered based on current time acquired by the clock 182. If it is determined that current time is time that has been previously registered, the setting of the cellular phone device 180, that is, incoming call volume, is changed.

Accordingly, incoming call volume of the cellular phone device can be automatically changed. For example, when it becomes 1 a.m., incoming call volume can be set to be lower. When it becomes 6 a.m., the incoming call volume can be set to return to original volume.

EXAMPLE 9

Example 9 corresponds to an example that, in a case in which one cellular phone device 200 has a plurality (for example, two) of telephone numbers, when the cellular phone device is located at an area that has been previously registered, the cellular phone device is automatically switched to a telephone number corresponding to that area. For example, when the cellular phone device is located within a 23rd zone of Tokyo, the telephone number of the cellular phone device 200 can be switched to "A". When the cellular phone device is located at areas other than the 23rd zone of Tokyo, the telephone number of the cellular phone device 200 can be switched to B.

Figure 23:
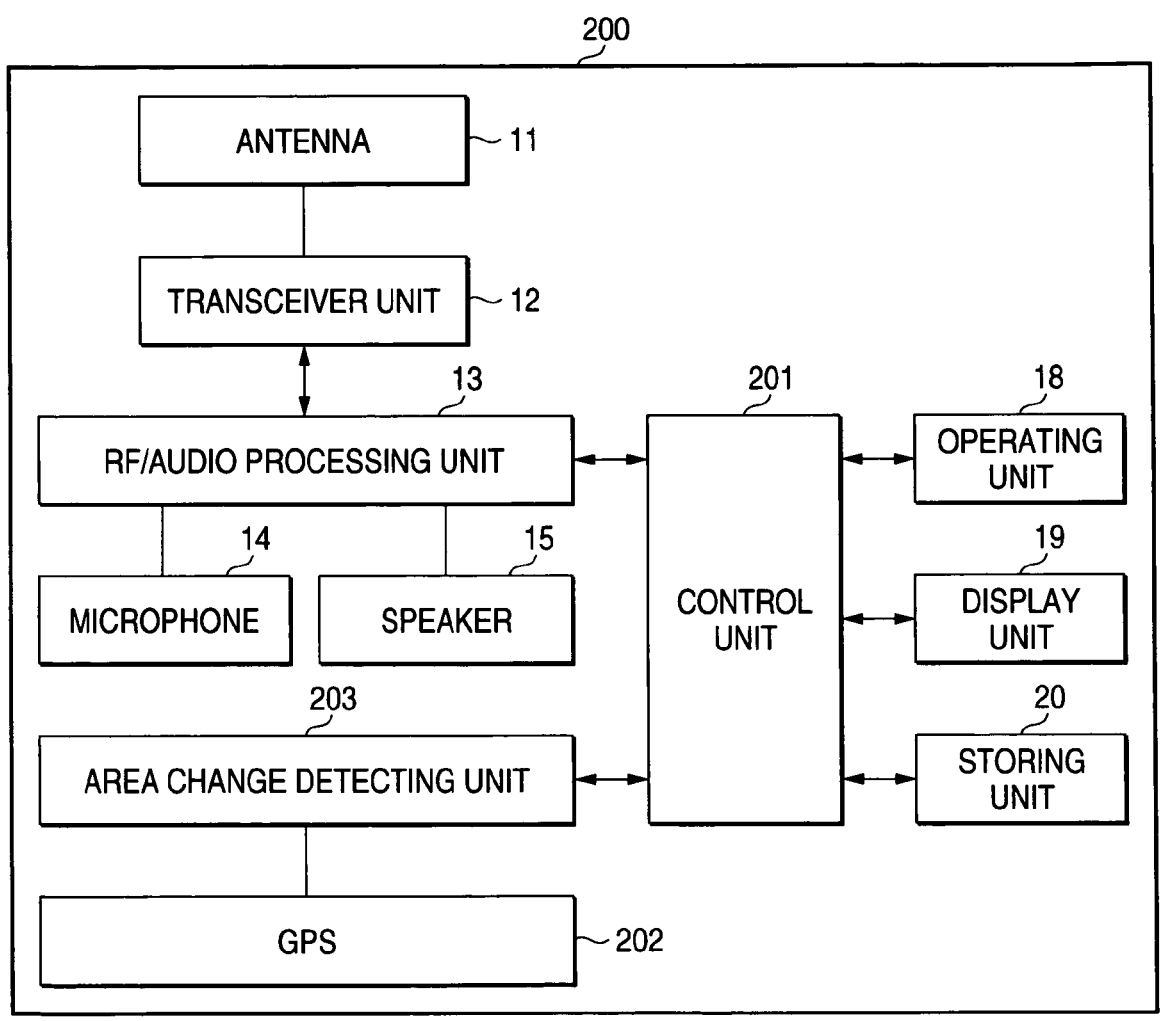
FIG. 23 is a block diagram showing the configuration of a cellular phone device in Example 9 of embodiment of the present invention.

FIG. 23 is a block diagram showing the configuration of the cellular phone device 200 according to the present example.

The cellular phone device 200 of Example 9 uses a GPS 202 as the sensor in the configuration of the cellular phone device 10 shown in FIG. 1. An area change detecting unit 203 is provided as a situation change detecting means. Moreover, the same parts as those of the cellular phone device 10 shown in FIG. 1 are represented by the same reference numerals and the descriptions thereof will be omitted.

The area change detecting unit 203 acquires current location information from the GPS 202. When the current location becomes an area that has been previously registered, the area change detecting unit 203 transmits an area change detection signal to a control unit 201.

If the area change detection signal is received from the area change detecting unit 203, the control unit 201 changes the setting of the cellular phone device 200, that is, a telephone number. The control unit 201 also controls the function of the cellular phone device 200 to be changed to a function corresponding to the telephone number after change.

Figure 24:
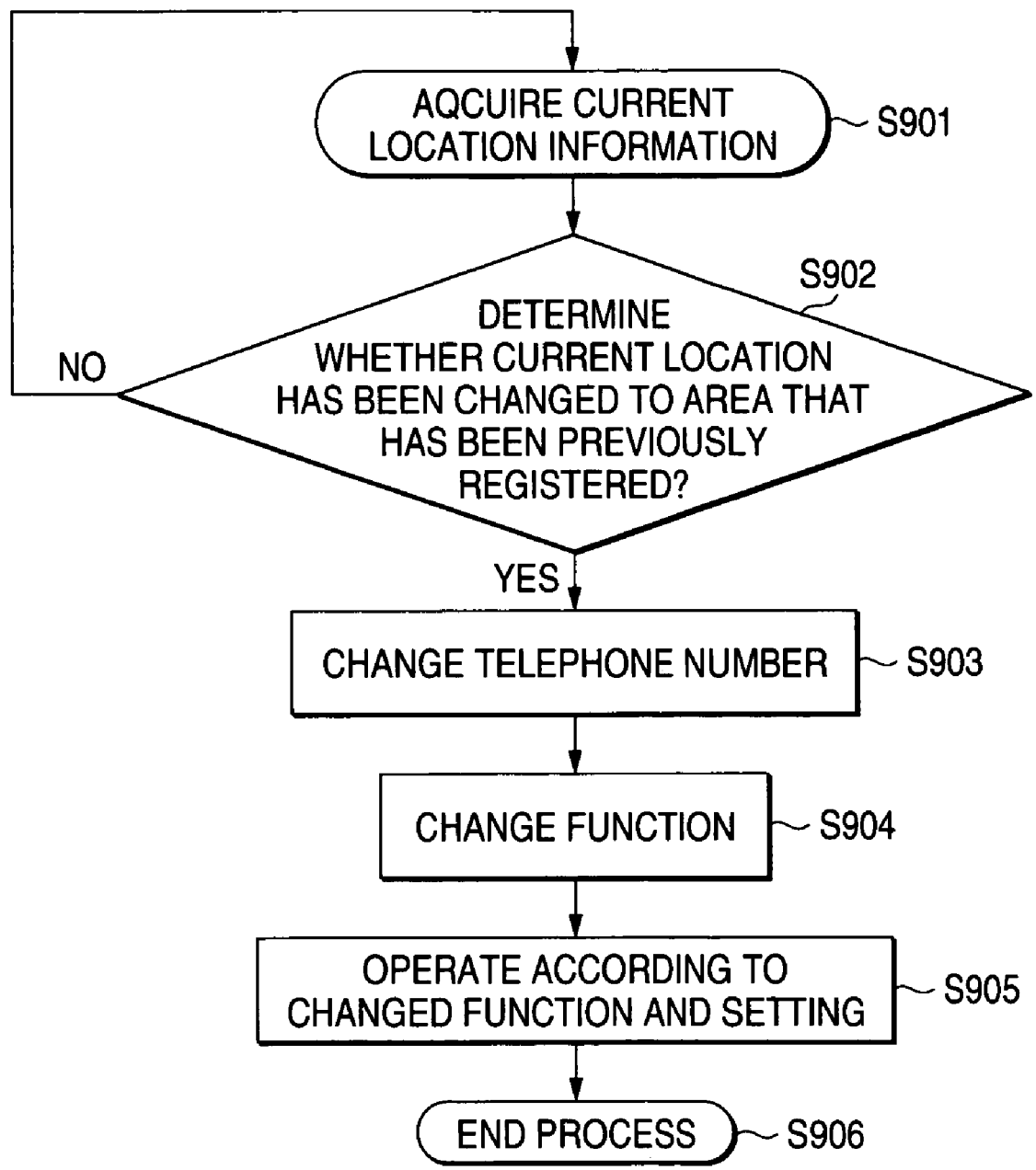
FIG. 24 is a flowchart illustrating the operation of Example 9.

FIG. 24 is a flowchart illustrating the operation of the cellular phone device 200 when an area is changed.

First, the area change detecting unit 203 acquires the current location information from the GPS 202 (Step S901).

Next, the area change detecting unit 203 determines whether or not the current location of the cellular phone device 200 has changed to an area previously registered based on the acquired current location information (Step S902). If it is determined that the current location of the cellular phone device 200 has changed to the area previously registered (YES), the area change detecting unit 203 transmits the area change detection signal to the control unit 201.

At the step S902, if the current location of the cellular phone device 200 has not changed to the area previously registered (NO), the process returns to the step S901 so as to acquire current location information from the GPS 202.

If the area change detection signal is received from the area change detecting unit 203, the control unit 201 changes the setting of the cellular phone device 200, that is, the telephone number (Step S903). Next, the control unit 201 controls the function of the cellular phone device 200 to be changed to a function corresponding to the telephone number after change (Step S904).

Accordingly, the cellular phone device 200 operates according to the changed function and setting (Step S905). Then, the process ends (Step S906).

As described above, in Example 9, it is determined whether or not the current location of the cellular phone device 200 is the area previously registered based on the current location acquired by the GPS 202. If it is determined that the current location of the cellular phone device 200 is the area previously registered, the setting of the cellular phone device 200, that is, the telephone number, is changed to the telephone number corresponding to the area.

Therefore, when the area of the current location of the cellular phone device is changed, the telephone number of the cellular phone device can also be automatically changed.

As described above in detail, the communication terminal apparatus 10 according to this embodiment of the present invention has the situation change detecting unit (situation change detecting means) 18 that detects a change in external situation and transmits an external situation change detection signal, and a control unit (control means) 11 that reads out a predetermined function and/or setting stored in a storing unit (storing means) 21 in response to the external situation change detection signal and changes the function and/or setting. Therefore, when the external situation is changed, the setting of the communication terminal apparatus 10 can be automatically changed according to the change.

What is claimed is:

1. A communication terminal apparatus comprising:
a calendar unit;
a clock unit;
a situation change detecting unit that:
   acquires a current time from the clock unit and a current date and a day of the week from the calendar unit;
   determines if the acquired time, date, day of the week corresponds to first period or second period; and
   outputs a change detection signal when detecting change of determination of the first period and the second period;
a storage unit that stores first setting information including a first phone number and mail address for the first period and second setting information including a second phone number and mail address for the second period;
a control unit that reads out the first setting information or the second setting information based on the determination of the first period and the second period when receiving the change detection signal and changes a phone number and a mail address of the communication terminal to the first phone number and mail address or the second phone number and mail address based on the setting information read out from the storage unit.

2. The communication terminal apparatus according to claim 1, wherein the first phone number and mail address is a phone number and mail address for work, and the second phone number and mail address is a phone number and mail address for private.

* * * * *